US010715485B2

(12) United States Patent
Miller et al.

(10) Patent No.: US 10,715,485 B2
(45) Date of Patent: Jul. 14, 2020

(54) MANAGING DYNAMIC IP ADDRESS ASSIGNMENTS

(71) Applicant: AMAZON TECHNOLOGIES, INC., Seattle, WA (US)

(72) Inventors: Kevin Christopher Miller, Fairfax, VA (US); Michael Siaosi Voegele, Bethesda, MD (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/688,608

(22) Filed: Aug. 28, 2017

(65) Prior Publication Data

US 2018/0041468 A1 Feb. 8, 2018

Related U.S. Application Data

(63) Continuation of application No. 14/741,148, filed on Jun. 16, 2015, now abandoned.

(51) Int. Cl.
*H04L 29/12* (2006.01)
*H04L 29/06* (2006.01)
*H04L 29/08* (2006.01)
*G06F 9/455* (2018.01)

(52) U.S. Cl.
CPC ...... *H04L 61/2007* (2013.01); *G06F 9/45558* (2013.01); *H04L 61/30* (2013.01); *H04L 63/0236* (2013.01); *H04L 63/0263* (2013.01); *H04L 63/101* (2013.01);

(Continued)

(58) Field of Classification Search
CPC .................................................. H04L 61/2007
See application file for complete search history.

(56) References Cited

U.S. PATENT DOCUMENTS 6,011,795 A 1/2000 Varghese et al.
6,052,372 A * 4/2000 Gittins ................... H04L 29/06
370/396

(Continued)

OTHER PUBLICATIONS

TechTerm, "GUI", 2019 (Year: 2019).*

(Continued)

*Primary Examiner* — Ondrej C Vostal
(74) *Attorney, Agent, or Firm* — Davis Wright Tremaine LLP

(57) ABSTRACT

Various systems and processes may be used to manage Internet Protocol (IP) addresses that are dynamically assigned. In particular implementations, systems and processes for managing IP addresses that are dynamically assigned may include the ability to determine whether an identifier for a web service has been received from a customer having one or more virtual machines in a service provider network, the web service being accessible by the customer's virtual machines over an external communication network. The systems and processes may also include the ability to determine a number of IP addresses for the web service, identify virtual machines of the customer that are allowed to communicate with the web service, generate one or more IP address lists for the identified virtual machines, and update security tables for the identified virtual machines with the IP address lists at server computers hosting the identified virtual machines.

24 Claims, 9 Drawing Sheets

(52) U.S. Cl.
CPC ............ *H04L 63/108* (2013.01); *H04L 63/20* (2013.01); *H04L 67/16* (2013.01); *G06F 2009/45587* (2013.01)

(56) References Cited

U.S. PATENT DOCUMENTS

| | | | | |
|---|---|---|---|---|
| 6,151,624 | A * | 11/2000 | Teare | H04L 29/12009 709/217 |
| 6,618,760 | B1 * | 9/2003 | Aramaki | H04L 45/00 709/238 |
| 6,854,010 | B1 * | 2/2005 | Christian | G06Q 10/10 709/219 |
| 7,127,524 | B1 | 10/2006 | Renda et al. | |
| 7,761,595 | B1 * | 7/2010 | Drennen | H04L 29/12066 709/227 |
| 7,769,877 | B2 | 8/2010 | McBride et al. | |
| 7,962,470 | B2 | 6/2011 | Degenkolb et al. | |
| 8,146,147 | B2 * | 3/2012 | Litvin | H04L 63/0263 709/225 |
| 8,374,183 | B2 * | 2/2013 | Alkhatib | H04L 29/12047 370/392 |
| 8,578,076 | B2 | 11/2013 | van der Linden et al. | |
| 8,688,792 | B2 | 4/2014 | Singh et al. | |
| 8,909,780 | B1 * | 12/2014 | Dickinson | G06F 9/45533 709/220 |
| 8,930,529 | B1 * | 1/2015 | Wang | H04L 61/15 709/224 |
| 9,009,704 | B2 * | 4/2015 | McGrath | G06F 9/455 718/1 |
| 9,038,062 | B2 * | 5/2015 | Fitzgerald | G06F 9/45533 718/1 |
| 9,262,642 | B1 * | 2/2016 | Roth | G06F 21/62 |
| 9,455,969 | B1 * | 9/2016 | Cabrera | H04L 67/1004 |
| 9,477,531 | B2 * | 10/2016 | Chawla | G06F 9/5077 |
| 9,672,054 | B1 * | 6/2017 | Gupta | G06F 9/45533 |
| 9,813,509 | B1 * | 11/2017 | Visser | H04L 67/16 |
| 10,228,959 | B1 * | 3/2019 | Anderson | G06F 9/45558 |
| 2003/0110242 | A1 | 6/2003 | Brown et al. | |
| 2003/0145104 | A1 * | 7/2003 | Boden | H04L 12/4641 709/238 |
| 2003/0233576 | A1 * | 12/2003 | Maufer | H04L 29/06 709/226 |
| 2004/0117657 | A1 * | 6/2004 | Gabor | H04L 63/0428 726/4 |
| 2004/0153470 | A1 * | 8/2004 | McLintock | B07C 3/00 |
| 2005/0053063 | A1 * | 3/2005 | Madhavan | H04L 29/12009 370/389 |
| 2005/0198303 | A1 | 9/2005 | Knauerhase et al. | |
| 2005/0249199 | A1 * | 11/2005 | Albert | H04L 67/1008 370/352 |
| 2006/0020692 | A1 | 1/2006 | Jaffray et al. | |
| 2006/0026154 | A1 | 2/2006 | Altinel et al. | |
| 2006/0028996 | A1 * | 2/2006 | Huegen | H04L 63/1466 370/252 |
| 2006/0190580 | A1 | 8/2006 | Shu et al. | |
| 2007/0078860 | A1 | 4/2007 | Enenkiel | |
| 2007/0169199 | A1 | 7/2007 | Quinnell et al. | |
| 2007/0171921 | A1 | 7/2007 | Wookey et al. | |
| 2008/0010288 | A1 * | 1/2008 | Hinton | G06F 17/30545 |
| 2008/0056262 | A1 | 3/2008 | Singh | |
| 2008/0133674 | A1 * | 6/2008 | Knauerhase | H04L 51/04 709/206 |
| 2008/0313318 | A1 * | 12/2008 | Vermeulen | G06F 9/45533 709/223 |
| 2009/0144403 | A1 * | 6/2009 | Sajassi | H04L 12/4625 709/223 |
| 2009/0213763 | A1 * | 8/2009 | Dunsmore | H04L 12/42 370/258 |
| 2010/0287548 | A1 * | 11/2010 | Zhou | G06F 9/4856 718/1 |
| 2011/0022812 | A1 | 1/2011 | van der Linden et al. | |
| 2011/0142053 | A1 | 6/2011 | Van Der Merwe et al. | |
| 2011/0170448 | A1 * | 7/2011 | Buob | H04L 41/00 370/252 |
| 2011/0178831 | A1 | 7/2011 | Ravichandran | |
| 2011/0251992 | A1 * | 10/2011 | Bethlehem | H04L 12/2863 707/610 |
| 2012/0023257 | A1 * | 1/2012 | Vos | H04L 29/12377 709/232 |
| 2012/0117563 | A1 * | 5/2012 | Chang | G06F 9/45558 718/1 |
| 2012/0159483 | A1 | 6/2012 | He et al. | |
| 2012/0173757 | A1 * | 7/2012 | Sanden | G06F 9/45558 709/238 |
| 2012/0203877 | A1 | 8/2012 | Bartholomay et al. | |
| 2013/0018994 | A1 * | 1/2013 | Flavel | H04L 41/0806 709/220 |
| 2013/0019277 | A1 | 1/2013 | Chang et al. | |
| 2013/0036416 | A1 * | 2/2013 | Raju | G06F 9/45558 718/1 |
| 2013/0061047 | A1 * | 3/2013 | Sridharan | H04L 12/4666 713/162 |
| 2013/0227303 | A1 * | 8/2013 | Kadatch | G06F 21/554 713/193 |
| 2013/0232492 | A1 * | 9/2013 | Wang | H04L 61/2084 718/1 |
| 2013/0238785 | A1 * | 9/2013 | Hawk | G06F 9/5072 709/224 |
| 2013/0283263 | A1 * | 10/2013 | Elemary | G06F 9/45558 718/1 |
| 2013/0326062 | A1 * | 12/2013 | Ryner | H04L 67/14 709/225 |
| 2013/0340028 | A1 | 12/2013 | Rajagopal et al. | |
| 2014/0086177 | A1 | 3/2014 | Adjakple et al. | |
| 2014/0165177 | A1 * | 6/2014 | Alagha | H04L 63/0272 726/9 |
| 2014/0165189 | A1 * | 6/2014 | Foley | H04L 63/20 726/22 |
| 2014/0201735 | A1 | 7/2014 | Kannan et al. | |
| 2014/0245423 | A1 * | 8/2014 | Lee | H04L 63/0218 726/12 |
| 2014/0282510 | A1 * | 9/2014 | Anderson | G06F 9/45558 718/1 |
| 2014/0289791 | A1 * | 9/2014 | Acharya | H04L 63/0236 726/1 |
| 2014/0359749 | A1 * | 12/2014 | Rieke | H04L 63/02 726/11 |
| 2015/0007283 | A1 | 1/2015 | Brugger et al. | |
| 2015/0012665 | A1 * | 1/2015 | Kang | G06F 9/45558 709/245 |
| 2015/0106489 | A1 * | 4/2015 | Duggirala | H04L 61/2503 709/222 |
| 2015/0120936 | A1 * | 4/2015 | Palan | H04L 47/70 709/226 |
| 2015/0128245 | A1 * | 5/2015 | Brown | H04L 47/323 726/12 |
| 2015/0195137 | A1 * | 7/2015 | Kashyap | H04L 41/0893 370/254 |
| 2016/0056975 | A1 * | 2/2016 | Marin | H04L 67/10 709/220 |
| 2016/0098287 | A1 * | 4/2016 | Prasad | G06F 9/45558 718/1 |
| 2016/0124764 | A1 * | 5/2016 | Nithrakashyap | G06F 16/13 718/1 |
| 2016/0182458 | A1 * | 6/2016 | Shatzkamer | H04L 63/0428 713/168 |

OTHER PUBLICATIONS

Australian First Examination Report No. 1, dated Jun. 7, 2018, for Patent Application No. 2016280163, 29 pages.
Singapore Written Opinion, dated Jul. 23, 2018, for Patent Application No. 11201709450X, 7 pages.
Singapore Notice of Eligibility for Grant, dated Mar. 29, 2019, for Patent Application No. 11201709450X, 1 page.
Singapore Supplementary Examination Report, dated Mar. 29, 2019, for Patent Application No. 11201709450X, 5 pages.

(56) References Cited

OTHER PUBLICATIONS

European Intention to Grant, dated Feb. 13, 2019, Patent Application No. 16735764.9, 70 pages.
Australian Notice of Acceptance, dated Jan. 25, 2019, for Patent Application No. 2016280163, 3 pages.
Chinese First Office Action for Patent Application No. 201680033106.9 dated Mar. 25, 2020, 3 pages.

* cited by examiner

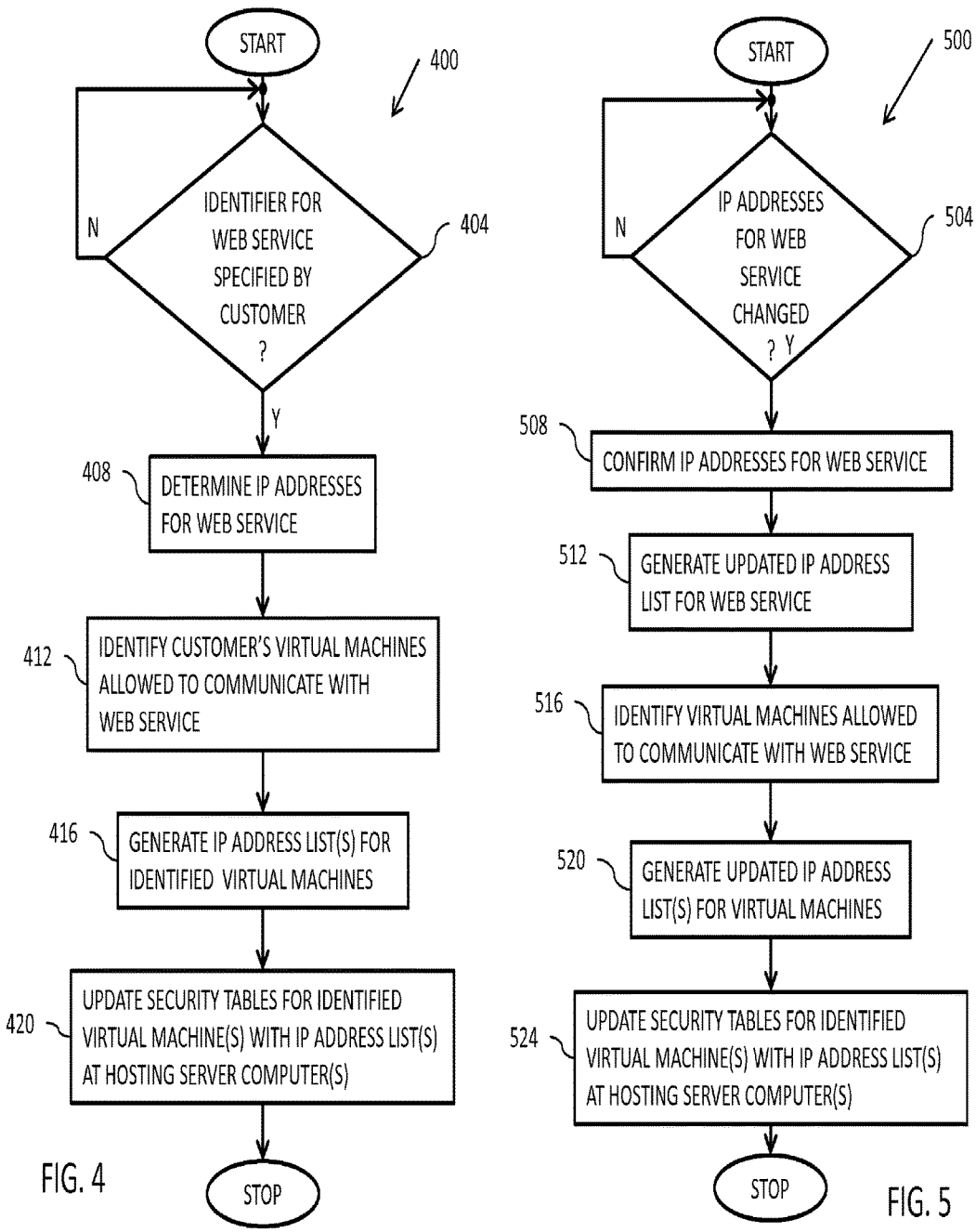

MANAGING DYNAMIC IP ADDRESS ASSIGNMENTS

BACKGROUND

Some network-based computing service providers allow customers to purchase and utilize computer resources, such as virtual machine instances, on a permanent or as-needed basis. In addition to virtual machine instances, such computing service providers typically allow customers to purchase and utilize other types of computer resources. For example, customers might be permitted to purchase access to and use file and block data storage resources, database resources, networking resources, and other types of computer resources. Utilizing these computer resources as building blocks, customers of such a network-based computing service provider can create custom solutions that provide various types of functionality, such as application hosting, backup and storage, content delivery, World Wide Web ("Web") hosting, enterprise information technology ("IT") solutions, database services, and others.

When requesting certain types of computer resources, such as virtual machine instances, customers of network-based service providers such as those described above are typically able to specify some generic details about the actual hardware and software platform that is allocated to provide the computer resources. For example, in the case of virtual machine instances, a customer might be permitted to specify the desired amount of processing memory, the desired level of processing capability, and a desired amount of disk storage. The network-based computing service then selects a particular hardware platform, such as a particular server computer, to utilize to instantiate the virtual machine requested by the customer.

BRIEF DESCRIPTION OF THE DRAWINGS

FIG. 4 is a flow diagram illustrating another example process for managing dynamic IP address assignments.

FIG. 5 is a flow diagram illustrating an additional example process for managing dynamic IP address assignments.

DETAILED DESCRIPTION

Figure 1:
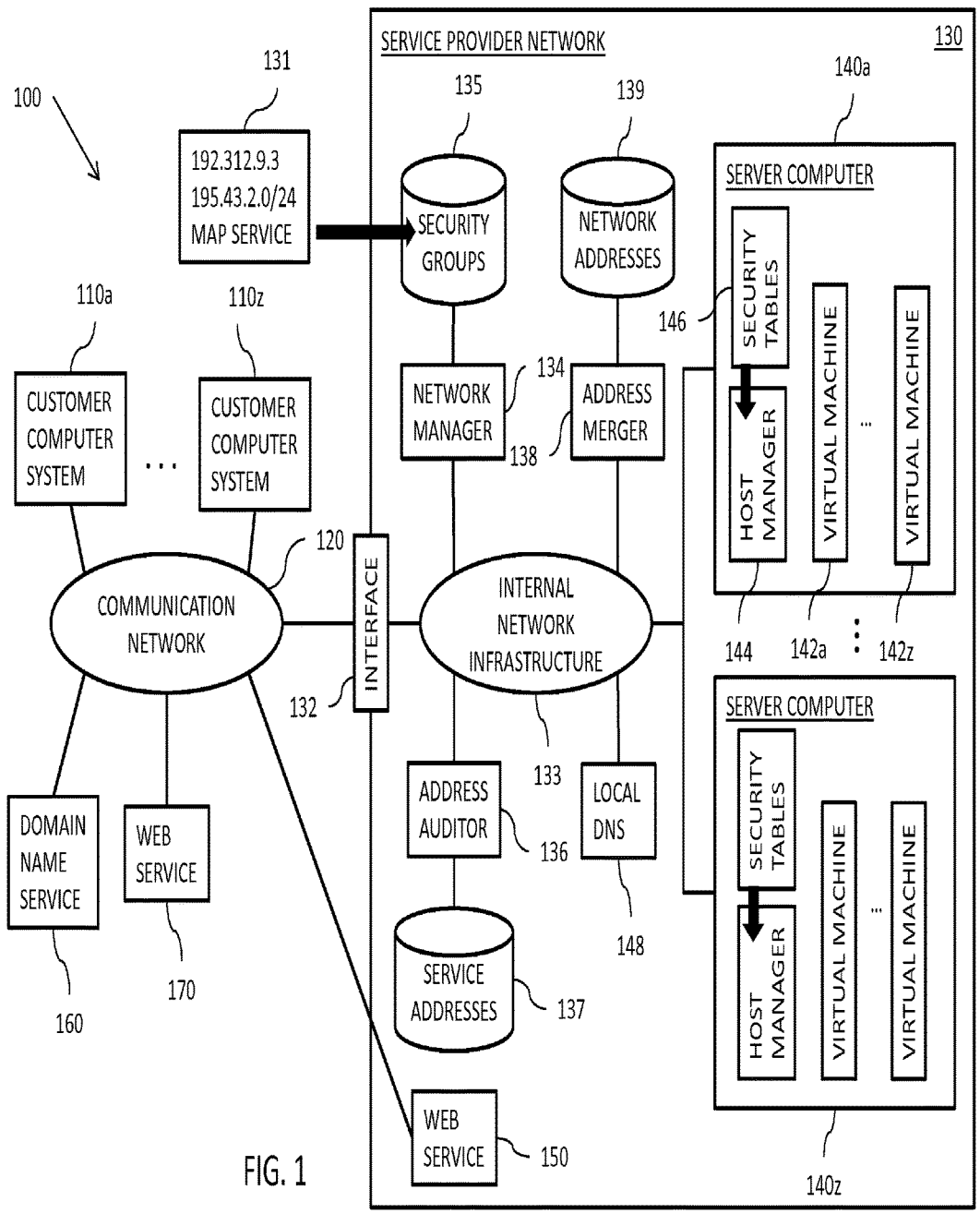
FIG. 1 is a block diagram illustrating selected components of an example system for managing dynamic IP address assignments.

The following describes systems, processes, and techniques for managing security rules for computer network addresses, and, in particular, computer network addresses that are assigned to web services. Web services are typically accessible over a communication network (e.g., the Internet) and may provide, among other things, general informational technology services (e.g., computing and/or storage), access to information (e.g., databases), content delivery, or specialized computational services (e.g., mapping). For a variety of reasons, the network addresses for such services change over time (e.g., from week to week). Thus, it may be difficult for an individual to keep track of the network addresses in security rules so that their computer systems may continue to have access the web services.

The various mechanisms disclosed herein for managing computer network addresses that are dynamically assigned to web services may operate in conjunction with a network-based distributed computing environment operated by a service provider (which may be referred to herein as a "service provider network"), through which customers can purchase and utilize computer resources such as instances, data storage resources, database resources, networking resources, and other types of computer resources on a permanent or as-needed basis. As one particular example, a user may request an instance of a machine image (e.g., a virtual machine instance or an instance that runs directly on hardware), and a server computer can be selected to host an instance of the machine image (i.e., run the instance). The instance may be allocated all or a portion of the server computer's processing power, memory, storage, and networking bandwidth. Because the requestor does not actually have his own dedicated computer but only a logical partition of another computer (i.e., the server computer), the machine is termed a "virtual machine," although it does in fact have physical processors, memory, storage, and/or networking.

The service provider operating the service provider network may charge a fee for providing the computer resources, and in this case, the requestor may be considered a customer of the service provider. The service provider might also utilize various purchasing models to determine how much to charge the customer for the use of computer resources. As mentioned above, customers of such a service provider can utilize the computer resources as building blocks to create custom solutions that provide various types of functionality, such as application hosting, backup and storage, content delivery, Web hosting, enterprise IT solutions, database services, and others.

To assist a customer in managing computer network addresses for services remote from their virtual machines, in certain implementations, a customer of a service provider network may specify an easy to understand identifier for a web service (e.g., a common name for the web service). When the customer specifies the identifier for the web service, the service provider network makes the computer network addresses for the web service therefore available for various communication functions (e.g., routing tables or security tables) for the customer's virtual machines supported by the service provider network. Thus, a customer does not have to try to determine the network addresses for web services or open all network access to ensure that his virtual machines may have access thereto. Moreover, a customer does not have to update each different type of virtual machine with network addresses for a web service.

Additionally, the service provider network may audit the network addresses of the web service (e.g., on a periodic basis). When a new address is detected, that address may be added to the network address list for the web service. Thus, a customer's virtual machines may be able to reach the web service using the web service's network addresses. When a network address is detected as not being in use, the address may be removed from the address list for the web service. Thus, a virtual machine may have no unnecessary connections open, making it more difficult for the virtual machines to be exploited.

In particular implementations, a service provider network and a web service may work in a synchronous manner regarding network addresses for the web service. For example, when a web service is about to add one or more network addresses, the web service may notify the service provider network before placing the addresses into service. The service provider network may then update the communication functions for the virtual machines that are allowed to access the service regarding the new addresses and notify the web service once the virtual machines in the service provider network are ready to use the revised set of network addresses. The web service may then place the addresses into service. Thus, the virtual machines that are allowed to access the service may access the web service using the network addresses available for the web service.

As another example, when a web service is about to remove one or more network addresses from use, the web service may notify the service provider network before removing the addresses from service. The service provider network may then update the communication functions for the virtual machines that are allowed to access the web service regarding the addresses to be removed and notify the web service once the virtual machines in the service provider network are ready to use the revised set of network addresses. The web service may then remove the network addresses from use. Thus, the virtual machines that are allowed to access the service may have their available connections kept as small as possible, which makes it more difficult to exploit the virtual machines.

In particular implementations, the computer network addresses are Internet Protocol (IP) addresses. An IP address is typically expressed as four octets of 0-255 (e.g., 123.24.28.1). As used herein, "IP address(es)," "range of IP addresses" and "IP address prefix" may be used. It may be appreciated that while operations are described as being performed on a single IP address, this is for simplicity of explanation, and similar techniques may be applied on a range of IP addresses (an IP address prefix, such as 192.168/16, being a special form of a range of IP addresses).

The following will begin with an example operating environment for managing dynamic IP address assignments for a web service that a customer's computing operations in a web services platform may access. After that, example operating procedures that may be implemented in various portions of the web services platform to effectuate the management of the web service's IP addresses corresponding to the customer's computing operations in a web services platform are described.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, tablet computing devices, special-purposed hardware devices, network appliances, and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

FIG. 1 is a block diagram illustrating selected components of an example system 100 for managing dynamic IP address assignments. At a high level, system 100 includes a number of customer computer systems 110 that can send requests for computer resources (e.g., virtual machines) over a communication network 120 to a service provider network 130, which provides the computer resources. Service provider network 130 may allow customers to purchase and utilize computer resources (which might also be referred to herein as "resources"), such as virtual machine instances (which might also be referred to herein as "virtual machines" or "instances"), networking resources, storage resources, or other types of computer resources, from a service provider that operates the service provider network 130. These resources may be purchased on a permanent or as-needed basis. More detail about the operating environment, including more detail about individual components within system 100, is given with respect to FIGS. 2, 10, and 11 11.

Customer computer systems 110 may, for example, be personal computers, laptop computers, workstations, tablets, smart phones, servers, or any other appropriate computational device for communicating with service provider network 130 through communication network 120. Communication network 120 may, for example, be a combination of one or more local area networks, wide area networks, and wireless networks. In particular implementations, communication network 120 may include the Internet.

Among other things, service provider network 130 includes a number of server computers 140. As illustrated, each server computer 140 is capable of supporting a number of virtual machines 142. A virtual machine may, for example, be a partition of processing resources, memory resources, storage resources, and networking resources on a server computer 140. After partitioning, a virtual machine may execute to perform functions for the customer, such as a function of a web server for the customer's web site, or to perform compute functions, such as encoding video. Virtual machines 142 may vary in type and size from each other.

To request computer resources, a customer computer system 110 may submit a resource request through communication network 120. The resource request may, for instance, request that the service provider network 130 instantiate a new instance of a virtual machine, which would be provisioned on one of server computers 140. The resource request could, for example, include an instance type identifier that generally specifies the type of virtual machine instance that is requested. For example, the instance type identifier might generally specify a desired level of processing capability, a desired amount of processing memory, and a desired amount of storage for the new virtual machine instance.

The service provider operating the service provider network 130 may charge a fee for operating the computer resources to the customer that requests and uses the resources. The fee charged for a particular resource might be based upon the type and/or configuration of the resource. The fee charged for a particular resource might also be based upon the amount of time the resource is utilized. For example, in the case of a data processing resource, like a virtual machine instance 142a, the fee for use of the resource might be charged based upon the configuration of the virtual machine instance and the amount of time the virtual machine instance is utilized. In the case of a data storage resource, the fee might be computed based upon the amount of data stored and/or the amount of data transferred into or out of storage. The fees for other types of resources might be based upon other considerations. A service provider might also utilize various purchasing models to determine the amount to charge a customer for use of resources provided by the service provider.

Customer computer systems 110 may provide resource requests to service provider network 130 through an interface 132. Interface 132 may, for example, be a web services application programming interface (API) to allow customers to submit resource requests. In one implementation, the functionality for submitting a resource request is provided by an API call through which a customer can specify a resource request. For instance, an example API call might allow customers of the service provider network 130 to specify information regarding a virtual machine instance 142 (e.g., processing capability, processing memory, and network bandwidth). In certain embodiments, interface 132 may be implemented as a gateway router.

Server computers 140 include a host manager 144, which is responsible for managing virtual machines 142. For example, host manager 144 may be configured to configure and launch the virtual machines. Host manager 144 may, for instance, be a hypervisor or another type of program configured to enable the execution of multiple virtual machines on a single server computer.

As part of its duties, host manager 144 may include security tables 146 for the virtual machines. Security tables 146 may define the IP addresses to which the virtual machines 142 may communicate (e.g., over communication network 120). In some instances, a virtual machine for a customer may be running proprietary programs for the customer, and thus, the customer may not desire the virtual machine to communicate with any computer system over communication network 120. In other instances, a customer may desire a virtual machine to communicate with certain computers systems over communication network 120 (e.g., computers that provide specific services). In still other instances, a customer may allow a virtual machine to communicate with a large number computers over communication network 120. Security tables 146 designate the IP addresses (e.g., in the form of a list) to which each virtual machine 142 may communicate. These IP addresses may be listed in full form (e.g., 123.1.23.43) or in abbreviated forms (e.g., classless inter-domain routing (CIDR) notation).

A range of IP addresses in CIDR notation may, for example, be expressed as 203.0.113.0/24, which would specify 256 addresses (e.g., 203.0.113.0-203.0.113.255). (The trailing number specifies how many bits must be matched.) As an example of specifying a particular IP address in CIDR notation, the IP address 203.0.113.1 could be expressed as 203.0.113.1/32. Expressing the IP address as 203.0.113.1/0 in CIDR notation opens up all connections.

Within the service provider network 130, interface 132 connects to another computer network—network infrastructure 133. Network infrastructure 133 may, for example, be an intranet that is separate from communication network 120. Also connected to network infrastructure 133 are a network manager 134, an address auditor 136, an address merger 138, and server computers 140. Network manager 134, address auditor 136, and address merger 138 may, for example, be implemented as services, which could include one or more computer systems. An example service is discussed below with respect to FIG. 2.

Network manager 134 is responsible for managing customer requests regarding communications for requested computing resources (e.g., for virtual machines 142). For example, network manager 134 may be responsible for keeping track of security tables for virtual machines specified by customers, which are used to determine whether to reject or allow traffic to or from the customer virtual machines. Network manager 134 may store the network data in security group database 135. A security group is a specification of one or more security rules for a virtual machine, which may include the IP addresses and rules for allowing or rejecting traffic to or from the IP addresses. In particular implementations, a security group may be associated with more than one type of virtual machine.

As part of establishing a virtual machine, a customer may specify one or more security groups 135 for the virtual machine at the network manager 134. The rules of a security group may control the inbound traffic that is allowed to reach the virtual machines that are associated with the security group and the outbound traffic that is allowed to leave them.

A customer may add, edit, and remove rules to a security group at any time, and network manager 134 delivers (e.g., pushes) those changes to the security tables 146 associated with the appropriate virtual machines. The host manager 144 can include a security engine (e.g., a software module that runs in Dom0 of a Xen based virtualization system) in-line with the networking traffic to or from a virtual machine. The security engine is configured to receive security tables and set up/tear down IP rules (e.g., iptables rules). When an incoming or outgoing connection message is received by the security engine, the engine consults the security tables to determine whether the message is authorized or denied based on the IP address associated with the message.

In creating a security rule, a customer may specify the protocol to allow (e.g., Transmission Control Protocol (TCP), User Datagram Protocol (UDP), Internet Control Message Protocol (ICMP), etc.), the range or ports to allow for TCP or UDP, the type and code for ICMP, and one or more source (inbound) or destination (outbound) rules. Source or destination rules may include an individual IP address (e.g., 203.0.113.1) or ranges of addresses (e.g., in CIDR notation).

If there is more than one rule for a specific port, the most permissive rule may be applied. For example, if a customer has one rule that allows access to TCP port 22 from IP address 203.0.113.1 and another rule that allows access to TCP port 22 from any system, any system has access to TCP port 22.

Another way that a customer may specify security rules is to specify (e.g., select or input) an identifier for a web service, etc. For example, a customer may specify a user-friendly name for a web service like "S3" for the storage service available from Amazon.com of Seattle, Wash. (USA) or "Maps Service" for a mapping service available from an entity not operated by the service provider. As discussed in more detail below, network manager 134 is then responsible for coordinating with address auditor 136 and address merger 138 for determining the appropriate IP addresses for the network endpoint and delivering them to the server computers 140 hosting the virtual machines associated with that security group of the customer.

An example security group 131 is illustrated. Security group 131 allows access to a specific IP address (i.e., 192.312.9.3) and range or IP addresses (i.e., 195.42.2.0-195.42.2.255), and a web service (e.g., a map service). The web service may be affiliated or unaffiliated with service provider network 130.

As described in more detail later, address auditor 136 determines and validates IP addresses for various web entities, such as a website or a web service (e.g., a web service 150 or a web service 170). Address auditor 136 stores determined and validated addresses for the services in storage 137 in the process of auditing IP addresses for the services (e.g., address auditor 136 may store database tables that identify IP address prefixes and a purported use for those prefixes).

In general, services like web service 150 and web service 170 are publically accessible (e.g., over the Internet) and may provide any type of IT service. For example, the services may provide storage services (e.g., databases) or computational services (e.g., mapping services). Although web service 150 is shown as being part of service provider network 130, the service may be considered to be remote from parts of the service provider network because it is reached through the communication network 120 (at least on the data plane).

Web service 170 may be affiliated with service provider network 130 or a different entity. An affiliated service may, for example, directly provide service provider network 130 with identifying information (e.g., IP addresses or domain name). The identifying information may be provided on a regular (e.g., time driven) or irregular (e.g., event driver) basis. An independent service may not provide service provider network 130 with any identifying information, although the service provider network 130 may have it.

The network endpoints are assigned IP addresses, which may be expressed as IP address prefixes. In administering a web services platform, the entity that runs the web services platform may be assigned a range of publicly-accessible Internet Protocol (IP) addresses, and/or may have control of an intranet that is part of the web services platform, and have control of the full range of IP addresses for that intranet. In such a web services platform, an administrator may be tasked with assigning IP addresses or ranges of IP addresses to different sub-portions of the web services platform and/or customers of the service provider. For instance, one set of public IP address ranges may be assigned to, or reserved for, virtual machine (VM) instances that run on computing nodes (though not every address may be assigned at all times); another set of IP address ranges may be assigned to web services offered by the service provider.

Address auditor 136 may audit the information about how an IP address is to be used based on how that information is actually being used. Address auditor 136 may accomplish this by querying one or more sources (e.g., a router that implements a border gateway protocol (BGP), a domain name service (DNS), or a load balancer) for information about how an IP address is actually being used by a service, and then compare this information with the use manually identified by an administrator. Through this process, address auditor 136 may audit the use of IP addresses.

Address auditor 136 auditor may also determine the IP addresses for a service. Address auditor 134 may, for example, query a network endpoint (e.g., a load balancer or other network addressing device) for a service or a domain name service 170 to determine the IP addresses.

Address merger 138 is responsible for building a list of approved IP addresses for a customer's virtual machines 142. As part of this, address merger 138 may receive the addresses for the web services from address auditor 136 and merge them with any IP addresses specified in the security groups 135 for the virtual machines. As part of this, network merger 138 may resolve conflicts between network addresses. For example, address merger 138 may have a priority scheme (e.g., user specified addresses in a security group have highest priority), that it follows to resolve any IP address conflicts. Network manager 134 may then deliver the IP addresses to the server computers 140 for the appropriate virtual machines. At the server computers 140, host manager 144 may take care of updating security tables 146 for each virtual machine.

As mentioned above, in certain modes of operation, a customer may specify an identifier (e.g., a textual name) for a service like web service 150 or web service 170 in a security group, and network manager 134 may deliver the IP addresses for the service to the appropriate server computer 140. The specified identifier may be one that is provided by service provider network 130 or one that is determined by the user. If the specified identifier is provided by service provider network 130, the association between identifier and the web service (e.g., web service 150) may be understood. For example, network manager 134 may already have a domain name associated with the service identifier. If the specified identifier is determined by the user, the network manager 134 may undertake to determine the identity of the web service. For example, address auditor 136 may search the Internet for an associated domain name or IP address and/or interrogate the customer for association information (e.g., a domain name)). Address auditor 136 may also ensure that the determined identity of the web service is valid (e.g., by interrogating a DNS with the identity).

To deliver the IP addresses, address auditor 136 may generate an IP address list for the identified service. This list may have been generated before the user identified the service or after the user identified the service. If address auditor has already developed an IP address list for a service, address auditor 136 may validate the list upon specification of the service identifier.

Address auditor 136 may, for example, generate an IP address list for the service by interrogating (e.g., pinging) a domain name service, such as domain name service 160, or a network endpoint associated with the web service. A domain name service may return a list of IP addresses for a web service or just a single address. If a single address is returned, address auditor may repeatedly interrogate the domain name service to develop a list.

The address list for a service may not be complete at initiation, but, as discussed below, may be discovered over time and updated. If an incomplete address list is available for a web service, a local domain name service 148 may be used for virtual machines that need to access the service. The local domain name service 148 may store the partially developed list of network addresses for a service and be accessible by the virtual machines 142. Thus, if a virtual machine 142 needs to access a web service for which the address list is incomplete, the virtual machine may obtain an appropriate network address by interrogating local domain name service 148. Address auditor 136 may update the local domain name service 148 as security tables are updated at the virtual machines, discussed below.

Once address auditor 136 has developed the IP addresses for the identified service, address merger 138 may merge the information from the security group 135 identifying the service (e.g., any specified IP addresses) at network manager 134 with the IP address list generated for the service by address auditor 136. Network manager 134 may access the database containing the IP address list for the service and deliver it to address merger 138 or have address auditor deliver the address list to merge manager 138. Network manager 134 may then deliver (e.g., push) the merged address list to the server computers 140 that are hosting the virtual machines associated with the security group.

In some modes of operation, network manager 134, address auditor 136, and address merger 138 may coordinate with a service like web service 150 or web service 170 to place IP addresses into use and to take existing IP addresses out of use. The decisions regarding which IP addresses to use and remove are typically made internal to the services.

If a service desires to place one or more new IP addresses into use, it may place the IP addresses on an associated network endpoint (e.g., a load balancer) to indicate that they are in service and notify address auditor 136 of the new address(es). Address auditor 136 may then audit the IP address(es) to confirm their existence. For example, address auditor 136 could interrogate the associated network endpoint to determine if the IP addresses are in use. Assuming that the IP addresses exist and are valid, address auditor 136 may update the IP addresses for the service in database 137 and then notify address merger 138. Address merger 138 places the new IP addresses in appropriate IP address lists for the virtual machines that have access to the service. Note that a customer may have different types of virtual machines that may have access to a service. These virtual machines may also have access to different services from each other. Thus, each type of virtual machine for a customer may have different address lists. Moreover, these lists may also contain other IP addresses, such as those specified in associated security groups 135. Network manager 134 may then deliver the IP address lists to the server computers 140 that are hosting the virtual machines having access to the service. Once the IP address lists have been delivered to server computers 140, network manager 134 may notify address auditor 136 of the delivery. Address auditor 136 may then notify the service that it is safe to start using the new IP addresses. The service may then place the IP addresses into its associated domain name service, such as domain name service 160. The virtual machines can then find and start using the new IP addresses.

When a virtual machine 142 tries to communicate with a service, the virtual machine typically first tries to use an IP address that is already has cached. However, if it does not have an IP address already cached (e.g., it is too old or the service is new) or there is a problem with the IP address, the virtual machine may interrogate domain name service 160 to obtain an IP address. By assuring that security tables 146 have been updated before an IP address is placed on domain name service 160, a virtual machine will not receive an IP address that it is not allowed to reach.

If a web service desires to take IP addresses out of use, it may remove the IP addresses from the domain name service 160. This will prevent new address resolution requests from obtaining one of the IP addresses to be removed. However, virtual machines that still have the IP address cached may continue using the IP address for a period of time. The service may then wait until the traffic to that IP address has dropped to an appropriate level (e.g., to a complete stop or a low level) and then send a message to address auditor 136 that the IP addresses are no longer in service.

Address auditor 136 may confirm that the IP addresses are no longer in service (e.g., by interrogating an DNS or a network endpoint), update the IP addresses for the service in database 137, and notify address merger 138 of the updated IP addresses for the service. Address merger 138 may then create an updated IP address list for the virtual machines that are allowed to access the service, and network manager 134 may deliver the updated IP address lists to the server computers 140 hosting the affected virtual machines. The host managers 144 on the host computers may update the security tables 146 for the appropriate virtual machines. Once the updated IP address lists for the virtual machines have been delivered to the security tables, network manager 134 may notify address auditor 136, which notifies the service that it is safe to remove the IP addresses. The service may then remove the IP addresses from the network endpoint. Thus, remote computer systems (e.g., virtual machines 142) will no longer be able to access the service using the removed IP addresses.

Address auditor 136 may also periodically audit the IP addresses for the web services (e.g., every few minutes). To accomplish this, address auditor 136 may, for example, query the network endpoints for the services or perform a reverse DNS lookup. For example, it may ping a load balancer for service 150 at every IP address in service addresses 137 for the service. If an IP address is not found, address auditor 136 can begin the process of removing the IP address from security tables 146. Additionally, address auditor 136 may query domain name service 160 for addresses for a service and check these addresses against the addresses for the service in service addresses 137. If an IP address is discovered for the service, address auditor 136 may begin the process of adding the address to security tables 146.

To accomplish its functions, address auditor 136 may use sources, such as, for example, network endpoints and/or a DNS for the service to audit IP addresses. These sources may generally store information about an IP address that they, themselves, use to route traffic addressed to or from that IP address or that they supply to another entity that uses that information to route traffic addressed to or from that IP address.

A Domain Name Service (DNS) may include a hierarchical distributed naming system for computers, services or any resource connected to the Internet or a private network. It associates various information with domain names assigned to each of the participating entities. For example, a DNS may maintain an association between an IP address and a uniform resource locator (URL) that may be used to identify that IP address. Where the source is a DNS, querying the source may return a URL associated with the IP address or prefix, and querying the source with a URL may return an IP address for the service.

A source may also, for example, be an edge device that implements a border gateway protocol (BGP) that involves maintaining a table of IP prefixes that designate network reachability among various autonomous systems (AS). Where the source does implement BGP, querying the source may return the portion of that table that corresponds to the specified IP address or prefix.

The source also may be, for example, a regional internet registry (RIR) that manages the distribution of internet number resources including IP address space and AS numbers. An AS may be a collection of connected IP routing prefixes under the control of one or more network operators that presents a common, clearly-defined routing policy to the Internet. An ASN (AS number) may be used to then uniquely identify a network on the Internet. Where the source provides ASNs, querying the source may return an ASN associated with the IP address or prefix.

The source may also be, for example, a routing assets database (RADb), which comprises a lookup database that provides information about networks. The RADb may store associations between IP addresses and information used to route network traffic to, and from, those IP addresses, such as ASNs. Where the source is a RADb, querying the source may return an ASN associated with the IP address or prefix.

Using IP addresses in database 137, address auditor 136 may query a source as to the use of the IP address. Address auditor 136 may then determine whether the result received from querying the source matches stored information about the IP address. For example, where the source is DNS, and querying the source returns a URL, this URL may be compared against stored information about the IP address that indicates a use for the IP address. In a web services platform, URLs may be assigned in a well-defined manner, so that the URL indicates the use of a device that the URL identifies. For example, all IP addresses assigned to VM instances may be of the form "vm-instance-XX-web-services-platform.com," where XX is an integer that is unique among URLs for VM instances in the web services platform. Where the URL received from the DNS matches this format, then it may be determined that the result received from querying the source matches stored information about the IP address. Where the URL received from the DNS differs from this format (e.g., the received URL is in the form of "host-partition-XX-web-services-platform.com"), then it may be determined that the result received from querying the source matches stored information about the IP address.

When auditing a large number of IP addresses in a range, such as multiple IP addresses within an IP address prefix, it may be not be required that every IP address have a match. For example, there may be a predetermined threshold (e.g., 75%) that may be met to validate the IP addresses in a range. It may be, for instance, that a DNS is queried for a URL corresponding to each of 1,000 IP addresses. And it may be that the DNS has information for 1000 of those IP addresses and does not have information for the other 200 IP addresses. In cases like this, a threshold predetermined amount may exist that the number of results received from the semi-authoritative source must meet for the results to be used in further auditing the IP address assignments. For example, the threshold may be 75% of queried IP addresses must produce a corresponding result. In embodiments, this predetermined amount may be set by an administrator and may vary by the type of source (e.g., there may be a different predetermined amount for results obtained from a DNS than for results obtained from a BGP device). This predetermined amount may vary based on the number of IP addresses queried. For example, if fewer than 20 IP addresses are queried, the predetermined number may be 100%, but the predetermined number may be 75% for 20 or more IP addresses queried.

Where the number of results received from the source is at least as much as the predetermined amount, the results received by querying the source are used. The results received by querying the source may be used because the number of these results received was at least a threshold amount. When the results received are to be used, they may be compared with stored information about the IP address to see if these two pieces of information match.

In embodiments where not all IP addresses queried have corresponding results, it may be that the information about other IP addresses that is received is used to audit the IP addresses for which no information was received. For example, there may be 1,000 IP addresses queried to a DNS, 800 results are received, and all 800 results identify URLs that match the type of use of the IP address indicated in the stored information (e.g., the URLs for VM instances all have "vm-instance" in the URL and that is the case for each URL here). In this case, all 800 IP addresses for which results are received may be considered validated. Additionally, the other 200 IP addresses in the range of IP addresses may be considered to be validated because every IP address in the range that was able to be audited was validated. That is, the validation of these 200 IP addresses may be inferred.

Address auditor 136 may be logically divided into multiple components as described herein—Publisher, Registration Auditor, Route Views Auditor and Cloud Auditor. Each of these logical components is described in more detail below.

Publisher may create two files. One file may identify a mapping between a region and a network and a list of IP address prefixes (or a list of one or more IP addresses). A second file may identify a mapping between an IP address prefix and a network and a description of how that prefix is used, an identifier of whether the IP addresses are publicly available, an identifier of whether this prefix is a sub-block of another prefix identified in these files or an identifier of an owner of the prefix. Publisher may create these files, for example, in an eXtensible Markup Language-type (XML) format such as a JavaScript Object Notification (JSON) format.

An example of a JSON file may be:

```
<border>
 <regions>
  <region name="region-1">
   <networks>
    <network name="network-1">
     <publicBlocks>
      <publicBlock>
       <prefix name="A.B.C.D/E" public="PublicIP" />
      <publicBlock/>
     <publicBlocks/>
    <network/>
   <networks/>
  <region/>
 <regions/>
<border/>
```

Publisher may upload these files as database tables to object-level storage 118, where object-level storage 118 saves the files with a known filename format—e.g., "publisher-output-$timestamp$".

Registration Auditor may communicate with a whois server to validate registration information. A regional registrar (e.g., ARIN) may not have conflicting data about an origin AS number for a prefix. Registration Auditor may take the prefixes table as input and query a public whois server, such as whois.radb.net. An example command to issue to a whois server via a terminal prompt may be "whois -h whois.radb.net <prefix from the prefixes table>." Registration Auditor may store an output of its operations in a database table format, using a schema as follows: <prefix, timestamp>→{description, origin_asn, inconsistent_origin, maintainer}. Here, the timestamp identifies a time at which the whois command was run for the corresponding prefix, description is a public description of the prefix, origin_asn is an AS number associated with the prefix, inconsistent_origin is TRUE if the prefix has registration issues (e.g., the prefix is not registered by the entity that operates the web services platform, or different registrars have conflicting information and maintainer is a maintainer object in RADb.

The Route Views Auditor may download a snapshot of Tier-1 BGP exchanges to validate the IP prefixes based on what is advertised through BGP. The Route Views Auditor may take the prefixes table as input. The Route Views Auditor may then download BGP data from a web site that provides it. The Route Views Auditor may then validate the data stored in the prefixes table based on this BGP data. Route Views Auditor may store its output in a table called the prefixes audit table. A schema of this prefixes audit table may be <prefix, timestamp>=>{origin_asn, second_hop_count, advertised, inconsistent_origin_asn}. Here, origin_asn may be the AS number that is advertised for the prefix, second_hop_count may be the number of hops from a known location to the AS of the entity that provides the web services platform, advertised may be a boolean that denotes whether or not the prefix is advertised, and inconsistent_origin_asn may be a boolean that denotes whether a prefix is being advertised using different AS numbers.

Cloud Auditor may check IP addresses against prefixes to validate the IP addresses identified by the prefixes. Cloud Auditor may also validate metadata for each IP address, such as an instance type associated with the IP address, whether the IP address is associated with a virtual private cloud (VPC), whether the IP address is associated with a high performance cluster (HPC), whether the IP address is associated with a host partition of a computing node that supports VM instances or whether the IP address is associated with a VM instance.

Cloud Auditor may take as input information about where in a web services platform IP addresses are used (e.g., within which region or availability zone, as described below) and produce an output as a table called prefixes audit table, using the following schema <prefix, timestamp>=>{coverage, totalip, region, az}. Here, coverage is the number of IP addresses being used, totalip is the total number of IPs (including ones that are not used), region is the region in the web services platform that the prefix belongs to and az is the availability zone in the web services platform to which the prefix belongs. As used herein, a web services platform may be divided into multiple availability zones or regions (for example, an availability zone or region may comprise one or more data centers 1022 of FIG. 10) that are generally located in physically separate locations (e.g., one in Seattle and another in Chicago). For the purposes of this disclosure, an availability zone or region may each have a separate IP address space.

This collected information may be gathered by auditor 136 and used by auditor 136 to audit the use of IP addresses. Auditor 136 may audit a plurality of IP addresses in a range of IP addresses and, where information is not received for all of those IP addresses, use the information that is received for other IP addresses to audit the remaining IP addresses.

System 100 has a variety of features. By being able to allow customers to specify easy to understand identifiers (e.g., textual names) for a web service and automatically managing IP addresses for the web service, a customer may be able to easily allow access to web services for their virtual machines. Typically, a customer would have to manually enter one or more IP network addresses to allow their virtual machines to access a web service. But with system 100, the customer may just enter a name for the service.

Additionally, system 100 keeps the addresses for the web service up to date. Thus, a customer does not have to worry about his virtual machines trying to use an IP address that is no longer valid. Additionally, a customer does not have to worry that they have more connections exposed than are necessary for their virtual machines to access the web service.

In particular implementations, the web service and the service provider network may work in a synchronous manner with each other regarding IP addresses for the web service. For example, when a web service is about to add one or more IP addresses, the web service may notify the service provider network before placing the addresses into service. The service provider network may then update the communication functions for the virtual machines that are allowed to access the service regarding the new IP addresses and notify the web service once the virtual machines in the service provider network are ready to use the new addresses. The web service may then place the IP addresses into service. Thus, the virtual machines that are allowed to access the service may access the web service on the network addresses available for the web service. A similar procedure may be used when IP addresses are being taken out of service, which keeps the allowable connections to a minimum.

Although FIG. 1 illustrates one example system for managing dynamic IP address assignments, other systems for managing dynamic IP address assignments may include fewer, additional, and/or a different arrangement of components. For example, in some systems, addressing merging may be performed on server computers 140. For instance, the addresses for a service as well as the customer-specified addresses for the various virtual machines 142 may be delivered to the respective server computers 140. The server computers 140 may then merge the service addresses with the customer-specified addresses. Host manager 144 may, for example, be responsible for merging the service addresses with the customer-specified addresses. Additionally, although shown as separate, network manager 134, address auditor 136, and address manager 138 may be part of the same module.

Figure 2:
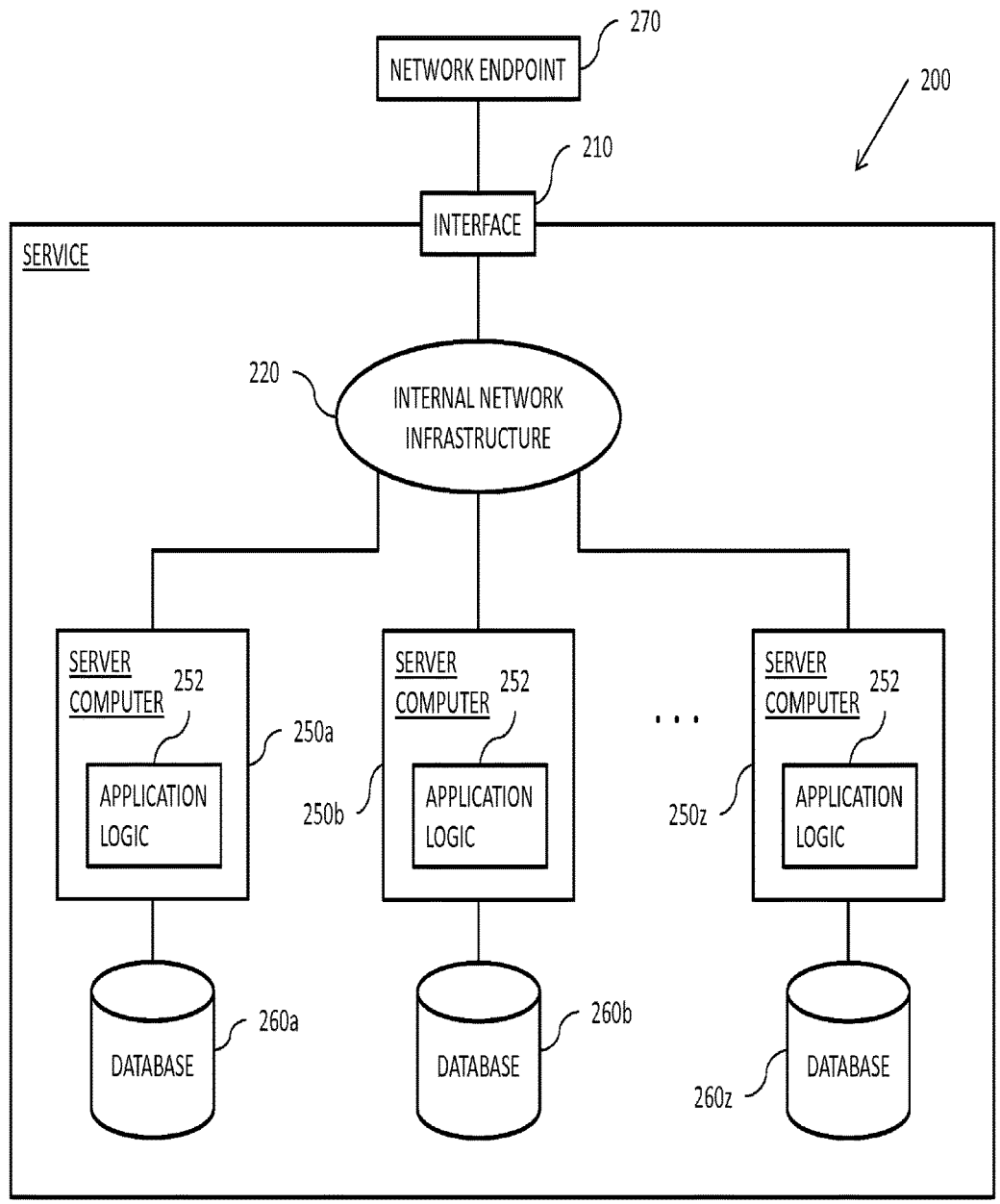
FIG. 2 is a block diagram illustrating selected components of an example service architecture.

FIG. 2 illustrates selected components an example service 200. Service 200 may, for example, represent a web service for which IP addresses may be dynamically assigned or a service in service provider network 130 (e.g., network manager 134, address auditor 136, or address merger 138). In particular implementations, service 200 may be a web service.

Among other things, service 200 includes an interface 210 at which requests for the service may be received. Interface 210 may, for example, provide an application programming interface (API) to allow remote computer systems to submit requests. In one implementation, the functionality for submitting a request is provided by an API call through which a requestor can specify a resource request. For instance, an example API call might allow remote computer systems like virtual machines 142 to specify information regarding what service they require. Interface 210 could also provide a graphical user interface (GUI) to allow user to access service 200.

Service 200 also includes an infrastructure 220, to which interface 210 and other components of service 200 connect. Infrastructure 220 may, for example, be an intranet that is separate from an external communication network.

Also connected to network infrastructure 220 are a number of server computers 250. Each server computer includes application logic 252 to execute the services provided by the service 200. The service provided by the service 200 may, for example, be basic informational technology services (e.g., processing, storage, etc.) or specific computational services (e.g., mapping, address management, etc.).

Coupled to server computers 250 are databases 260, which store the data required and generated by application logic 252 Databases 260 may be separate from each other or part of a larger database system and store the data required for using the service.

As illustrated, service 200 may have an associated network endpoint 270 (e.g., a load balancer), especially if the service is accessible over a public communication network (e.g., the Internet). A load balancer, for example, is responsible for distributing requests between server computers 250. In particular, a load balancer automatically distributes incoming application traffic across server computers 250, allowing greater fault tolerance and scalability.

Figure 3:
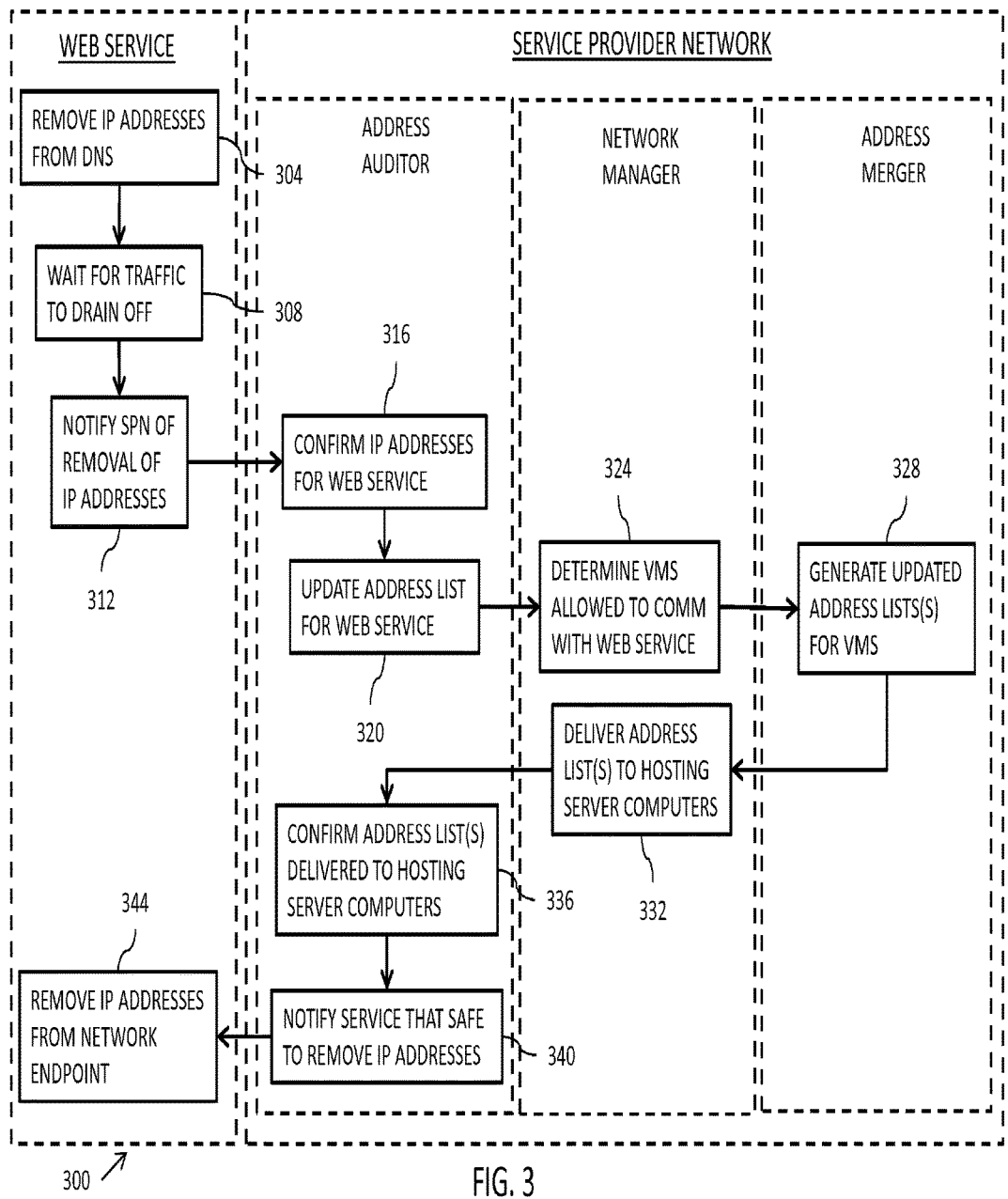
FIG. 3 is a flow diagram illustrating an example process for managing dynamic IP address assignments.

FIG. 3 illustrates an example process 300 for managing dynamic IP address assignments. Process 300 may, for example, be implemented by a system similar to system 100.

As illustrated, process 300 is carried out by two systems, a web service and a service provider network. Among other things, the service provider network may include a number of server computers that are each capable of hosting a number of virtual machines (e.g., partitions of processing resources, memory resources, storage resources, and networking resources on a server computer). A virtual machine may execute to perform functions for a customer, such as a function of a web server for the customer's web site, or to perform compute functions, such as encoding video, and the virtual machines for a customer or various customers may vary in type and size from each other. The web service may provide storage and/or computational services for the virtual machines and is remote from the service provider network in that it is accessible over a communication network that is not part of the service provider network. Thus, the service could be physically separate from the service provider network or part of the service provider network.

In process 300, IP addresses for the service provider network are being removed from use. The decision to remove IP addresses from use for the service provider network is a precursor to process 300 and may be based on a variety of factors.

Process 300 calls for removing IP addresses from a Domain Name Service (DNS) associated with the web service (operation 304). A service may remove IP addresses from a DNS before they are completely removed from use so that traffic to the service using the IP addresses begins to drain off. In an example embodiment, an administrator of the service may initiate the process of removing IP addresses. In another configuration, the process of removing IP addresses can be automated. For example, a request can be sent to a DNS to update the IP addresses. Process 300 then waits for traffic to the IP addresses being removed to drain off to an appropriate level (e.g., less than 10%) (operation 308). In some implementations, this may take just a few minutes. For example, the network endpoint 270 can be configured to periodically report the IP addresses that it is receiving traffic on to network manager for the web service. The network manager can track the IP addresses that are currently in use by the service. A list can be stored in a database and a process can periodically scan the list and sort the IP addresses that are in use. After use of an IP address falls below a threshold set by an administrator (e.g., 10% of traffic is directed to the IP address being removed), the web service then notifies the service provider network that the IP addresses are being removed from service (operation 312).

When the service provider network receives notice that the web service is removing IP addresses from service, the address auditor of the service provider network may confirm the IP addresses for the web service (operation 316). The address auditor may attempt to confirm just the IP addresses that are being removed or all of the IP addresses for the web service. To confirm the IP addresses that are being removed, the address auditor may interrogate the DNS with the IP addresses being removed. Since the IP addresses are no longer valid in the DNS, the DNS should respond that they are not associated with the web service. The address auditor may also perform a similar operation for the IP addresses that are not being removed (e.g., to verify that they are still in use). For example, the address auditor can include an interface, such as a web service API. In an embodiment, the messages from the network manager can include an identifier for the service (e.g., a name and location where the service operates) and the IP address range that has been removed. The message can be parsed and the contents (e.g., the identifier(s), and IP addresses) can be stored in a data store. The address auditor can include a worker process that checks the data store for new messages and then processes them by interrogating DNS with the IP addresses being removed. Once the IP addresses are removed, the address auditor can update the data store indicating the same.

Once the address auditor has verified the IP addresses for the web service, the address auditor may generate an updated IP address list for the web service (operation 320). The updated IP address list may, for example, be generated by removing the IP addresses being removed from a previous IP address list for the web service. In an embodiment, the address auditor can include a worker process that checks a data store for a set of validated IP addresses that are being removed, then extracts (e.g., deletes) the IP addresses from a previous IP address list for the web service.

Process 300 also calls for the network manager to determine which virtual machines operating in the service provider network are allowed to communicate with the web service (operation 324). This may, for example, be accomplished by examining security groups associated with the virtual machines to determine which security groups are associated with the service and determining which virtual machines the security groups are associated with. A security group may be associated with more than one type of virtual machine. In an embodiment, the network manager can include a worker process that checks (e.g., queries) a data store containing the security groups for the virtual machines for an identifier (e.g., name) of the web service having its IP addresses adjusted.

Process 300 also calls for the address merger to generate updated IP address list(s) for the identified virtual machine (s) (operation 328). This may, for example, be accomplished by merging the addresses for the web service with other IP addresses associated with the virtual machines. The other IP addresses may, for example, be specified in security groups. A different address list could be generated for each type of virtual machine. In an embodiment, the address merger can include a worker process that retrieves (e.g., queries) a data store containing the security groups for a virtual machine type and combines (e.g., merges) the addresses contained therein together. Merging the addresses may include appending different address lists together and removing redundancies. Updating an address list may also include expanding a prefix (e.g., 192.168/16) into a list of addresses (e.g., 192.168.0.0-192.168.255.255).

Process 300 also calls for the network manager to deliver the IP address lists(s) to the server computer(s) hosting the identified virtual machine(s) (operation 332). The updated address list(s) may be delivered (e.g., pushed) to the server computer(s) through a service provider network infrastructure. At the server computer(s), a host manager may manage updating security tables for the identified virtual machine(s) with the updated address lists so that the virtual machines are no longer able to send requests to the web service using the IP addresses being removed. In an embodiment, the host manager may generate a new security table for a virtual machine using the associated address list. The new security table could then be swapped for the existing security table. A temporary hold may be placed on establishing new communication sessions while the security tables are switched.

Process 300 also calls for the address auditor to confirm that the address lists have been delivered to the hosting server computers (operation 336) (e.g., by receiving a notification from the network manager) and notifying the web service that it is safe to remove the IP addresses (operation 340). For example, the network manager can include an interface, such as a web service API. In an embodiment, the host manager may send a confirmation message indicating that it has successfully received the address lists sent from the network manager. The message can be parsed, and a worker process in the network manager can then generate a message for the address auditor. The address auditor can also include an interface such as a web service API, and the message from the network manager can be parsed by a worker process to determine that the address lists for security tables for the virtual machines that are allowed to access the web service have been updated, and a message indicating that it is safe to remove the IP addresses from service may be generated and sent to the web service (e.g., over the Internet).

The web service may, for example, include an interface such as a web service API, and the message from the address auditor can be parsed by a worker process to determine that it is safe to remove the IP addresses from service. Once the web service receives notification that it is safe to remove the IP addresses from service, the web service may remove the IP addresses from an associated network endpoint (operation 344) so that machines may no longer communicate with the service using the IP addresses being removed. For example, the web service may send a message to the network endpoint to remove the IP addresses from service. The network endpoint can then remove the IP addresses from a database containing IP addresses for the web services (e.g., via a database delete operation).

Process 300 provides an interlock between a web service and a service provider network hosting a number of virtual machines that may use the service. By using process 300, the web service will not remove one or more addresses from service without the security tables for the virtual machines being updated first. Thus, the virtual machines may maintain tight control on connections and, hence, security.

A similar process may be used when IP addresses are being added for a web service. Instead of removing the IP addresses being deleted from a DNS, however, the IP addresses being added may be placed in a network endpoint. This will allow the service provider network to confirm the IP addresses upon being notified of the addition. Additionally, once the service provider network confirms that it is okay to start using the IP addresses (e.g., after sending the new IP addresses to security tables for the virtual machines), the web service may add the IP addresses to a DNS so that machines may find the IP addresses when attempting to communicate with the service.

Although FIG. 3 portrays service provider network having three different components (i.e., network manager, address auditor, and address merger), a service provider network may have one component (e.g., service) that performs all three of these functions. Additionally, these components may be distributed inside a service provider network.

FIG. 4 illustrates an example process 400 for managing dynamic IP address assignments. Process 400 may, for example, be implemented by a service provider network similar to service provider network 100.

Process 400 calls determining whether an identifier for a web service has been specified by a customer (operation 404). The identifier may, for example, be a user-friendly name for the service. The identifier may, for example, be selected by a customer from a predetermined list of web services, which could, for instance, be stored in a database, or specified by the customer. If an identifier has not been received for a service, process 400 calls for waiting to receive specification of a web service identifier.

Once a web service identifier has been received, process 400 calls for determining IP addresses for the service (operation 408). The IP addresses may, for example, be determined by interrogating a network endpoint or a DNS associated with the service. For instance, an address auditor of a service provider network may have a worker process that sends an interrogation (e.g., a ping) to a DNS over a public communication network for the identified web service. The DNS may return a single IP address for the web service or a list of IP addresses for the web services. The IP addresses for the service may, for example, have been discovered before the service identifier was received and stored. Thus, determining IP addresses for the service could be accomplished by retrieving them from storage. Additionally, the stored IP addresses could be verified and updated when the service identifier is received.

Process 400 also calls for identifying the customer's virtual machine(s) that are allowed to communicate with the service (operation 412). This may, for example, be accomplished by examining security groups specified by the customer to determine which ones are associated with the service and determining which virtual machines the security groups are associated with or examining metadata for the customer's virtual machine(s). In an embodiment, a network manager can include a worker process that checks (e.g., queries) a data store containing the security groups for an identifier (e.g., name) of the web service having its IP addresses adjusted. Multiple instances of a particular virtual machine may exist. Thus, a single security group may be associated with different types of virtual machines and/or multiple versions of the same virtual machine.

Process 400 further calls for generating one or more IP address lists for the identified virtual machine(s) (operation 416). This may, for example, be accomplished by merging the addresses for the service with other IP addresses associated with the virtual machine(s). The other IP addresses may, for example, be specified in security groups for the virtual machine(s). Each type of virtual machine may have its own address list.

In an embodiment, an address merger can include a worker process that retrieves (e.g., queries) a data store containing the security groups for a virtual machine type and combines the addresses contained therein together. Merging the addresses may include appending different address lists together and removing redundancies. Updating an address list may also include expanding a prefix (e.g., 192.168/16) into a list of addresses (e.g., 192.168.0.0-192.168.255.255).

Process 400 also calls for updating security tables for the identified virtual machine(s) with the IP address lists at the server computer(s) hosting the virtual machines (operation 416). A host server computer could, for example, receive an address list for a virtual machine or different address lists for different types of virtual machines. The address lists may be delivered to the server computers through a service provider network infrastructure. At the server computers, a host manager may manage updating the security tables with the updated address lists. In an embodiment, a host manager may generate a new security table for a virtual machine using the associated address list. The new security table could then be swapped for the existing security table. A temporary hold may be placed on establishing new communication sessions while the security tables are switched.

Process 400 allows a user to select a user-friendly identifier (e.g., a common name or a URL) for a web service and the IP addresses for the service to be made available for the customer's virtual machines (e.g., in security tables). Thus, a customer may allow access to a service without having to understand the IP addresses for the service. Moreover, the access may be narrowly tailored to the service. Thus, the customer does not have to open unwanted connections in their security protections.

FIG. 5 illustrates another example process 500 for managing dynamic IP address assignments. Process 500 may, for example, be implemented by a service provider network similar to service provider network 130. Process 500 may be used with process 400.

Process 500 calls determining whether the IP addresses for a web service have changed (operation 504). The IP addresses for a web service may, for example, have changed by IP addresses being added to or deleted from the service's IP addresses. Determining whether the IP addresses for a service have changed may, for example, be accomplished by receiving a notification from the service of a change in the IP addresses or detecting a change in the IP addresses during an audit of the service's IP addresses. If the IP addresses for a service have not changed, process 500 calls for waiting for a change in the IP addresses of a service.

In an embodiment, an address auditor can include an interface, such as a web service API, that can receive a message from a web service that includes an identifier for the service (e.g., a name and location where the service operates), the IP address range that is being affected, and the operation being performed (e.g., addition or removal). The message can be parsed and the contents (e.g., the identifier and the IP addresses) can be stored in a data store. The address auditor can include a worker process that checks the data store for new messages and then processes them by interrogating a DNS associated with the web service regarding IP addresses being removed and interrogating a load balancer regarding IP addresses being added.

In another embodiment, an address auditor may include a worker process that queryies one or more sources (e.g., a router that implements a BGP, a DNS, or a load balancer) for information about how an IP address is actually being used by a service, and then compares this information with the use manually identified by an administrator. Through this process, an address auditor may audit the use of IP addresses.

The address auditor may also include a worker process that determines the IP addresses for a web service. The worker process may, for example, query a network endpoint (e.g., a load balancer or other network addressing device) for a service or a domain name service to determine the IP addresses.

If any existing IP address are no long valid or additional IP addresses are found that are not in a data store of IP address for the web service, the worker process can decide that an IP address for the web service has changed.

Once it is determined that the IP addresses for a web service have changed, process 500 calls for confirming the IP addresses for the web service (operation 508). The IP addresses for the service may, for instance, be confirmed by a worker process for an address auditor interrogating a load balancer or a DNS associated with the service. A load balancer may, for example, provide a failure notification if an improper IP address is provided to it, indicating that an IP address has been removed. If a proper IP address is provided to a load balancer, a connection establishment message may be returned, which may be interpreted as a valid IP address.

Process 500 also calls for generating an updated IP address list for the web service (operation 512). This may, for example, be accomplished by updating a previous address list for the web service (e.g., adding and/or removing IP addresses). In an embodiment, an address auditor can include a worker process that adds new IP addresses for a web service to a data store (e.g., through a database insert operation) and removes unused IP addresses for the web service to the data store (e.g., through a database delete operation).

Process 500 additionally calls for identifying virtual machines that are allowed to communicate with the web service (operation 516). This may, for example, be accomplished by examining security groups to determine which ones are associated with the service and determining which virtual machines the security groups are associated with. In an embodiment, a network manager can include a worker process that checks (e.g., queries) a data store containing the security groups for an identifier (e.g., name) of the web service having its IP addresses adjusted. Additionally, multiple instances of a virtual machine may exist. Thus, a single security group may be associated with different virtual machines and/or multiple versions of the same virtual machine.

Process 500 further calls for generating one or more updated IP address lists for the virtual machines (operation 520). This may, for example, be accomplished by merging the addresses for the web service with other IP addresses associated with the virtual machines. The other IP addresses may, for example, be specified in security groups, which may have been specified by a customer for the particular type of virtual machine.

In an embodiment, an address merger can include a worker process that retrieves (e.g., queries) a data store containing the security groups for a virtual machine type and combines (e.g., merges) the addresses contained therein together. Merging the addresses may include appending different address lists together and removing redundancies. Updating an IP address list may also include expanding a prefix (e.g., 192.168/16) into a list of addresses (e.g., 192.168.0.0-192.168.255.255).

Process 500 also calls for updating security tables for the identified virtual machines with the address lists at the server computers hosting the virtual machines (operation 524). The address lists may be delivered to the server computers through a service provider network infrastructure. At the server computers, a host manager may manage updating the security tables for the respective virtual machines with the updated address lists.

In an embodiment, a host manager may generate a new security table for a virtual machine using the associated address list. The new security table could then be swapped for the existing security table. A temporary hold may be placed on establishing new communication sessions while the security tables are switched.

Process 500 allows changes in IP addresses for a web service to be made available for the customer's virtual machines (e.g., in security tables). Thus, the access to a service may be adjusted as the IP addresses for the service change, to allow the customer to continue having access while keeping the access narrowly tailored to the service. Thus, the customer does not have to open unwanted connections in their security protections.

Figure 6:
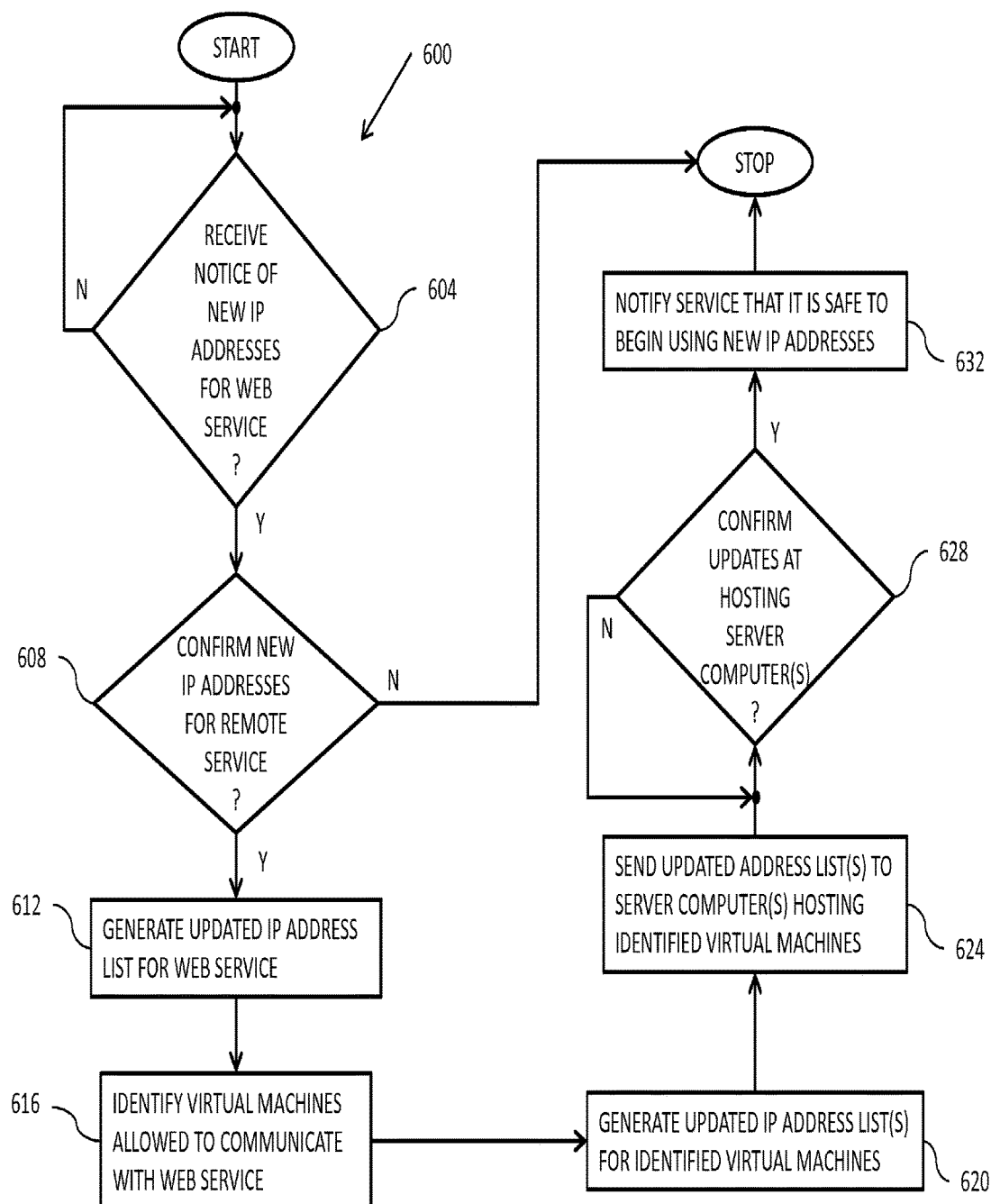
FIG. 6 is a flow diagram illustrating a further example process for managing dynamic IP address assignments.

FIG. 6 illustrates an additional example process for managing dynamic IP address assignments. Process 600 may, for example, be implemented by service provider network 130. Process 600 may be used in conjunction with process 400.

Process 600 calls for determining whether notice of one or more new IP addresses has been received for a service (operation 604). A service may provide notice of a new IP addresses before placing them into service so machines using the service may have their communication functions (e.g., routing tables and security tables) updated before the new IP addresses go into use. If notice of new IP addresses for a service has not been received, process 600 calls for continuing to wait to receive notice of new IP addresses for a service.

For example, an address auditor can include an interface, such as a web service API, that can receive a message from a web service, which can include an identifier for the service (e.g., a name and location where the service operates) and the IP address range that is being added. The message can be parsed and the contents (e.g., the identifier and the IP addresses) can be stored in a data store. The address auditor can include a worker process that checks the data store for new messages and then processes them.

Once notice of new IP addresses for a service has been received, process 600 calls for confirming the new IP addresses for the web service (operation 608). Confirming the new IP addresses for a service may, for example, be accomplished by interrogating a network endpoint (e.g., a load balancer) for the service regarding the new IP addresses. The service may, for example, place the IP addresses in the load balancer to begin allowing routing to the service. In one embodiment, the worker process may interrogate a network endpoint regarding the new IP address. If the endpoint returns a failure, the worker process may mark an address as not valid. If the network endpoint returns something other than a failure (e.g., a connection establishment), the worker process may mark the IP address as being valid.

If the new IP addresses cannot be confirmed for the service, process 600 is at an end. If, however, the new IP addresses for the service are confirmed, process 600 calls for generating an updated IP address list for the web service (operation 612). This may, for example, be accomplished by including the new IP addresses in a previous address list for the service.

In an embodiment, an address auditor can include a worker process that adds new IP addresses for a web service to a data store (e.g., through a database insert operation). In certain implementations, the worker process may query a data store before adding an entry to ensure that it is not inserting a duplicate entry.

Process 600 also calls for identifying virtual machines that are allowed to communicate with the web service (operation 616). This may, for example, be accomplished by examining security groups to determine which ones are associated with the service and determining which virtual machines the security groups are associated with. In an embodiment, a network manager can include a worker process that checks (e.g., queries) a data store containing the security groups for an identifier (e.g., name) of the web service having IP addresses being added.

Process 600 also calls for generating updated IP address lists for the identified virtual machines (operation 620). This may, for example, be accomplished by merging the IP addresses for the web service with other IP addresses associated with the virtual machines, which may vary by type. Thus, different lists may be generated for a customer's virtual machines that use the service. The other IP addresses may, for example, be specified in security groups.

In an embodiment, an address merger can include a worker process that retrieves (e.g., queries) a data store containing the security groups for a virtual machine type and combine the addresses contained therein together. Merging the addresses may include appending different address lists together and removing redundancies.

Process 600 also calls for sending the updated address lists(s) to the server computer(s) hosting the identified virtual machines (operation 624). The address lists may be delivered (e.g., pushed) to the server computers through a service provider network infrastructure. At the server computers, a host manager may manage updating the security tables for the respective virtual machines with the updated address lists. In an embodiment, a host manager may generate a new security table for a virtual machine using the associated address list. The new security table could then be swapped for the existing security table. A temporary hold may be placed on establishing new communication sessions while the security tables are switched.

Process 600 also calls for confirming the updated address lists at the hosting server computer(s) (operation 628). Confirming the updated address lists may, for example, be accomplished by confirming that the IP address lists have been distributed to the server computers hosting the identified virtual machines (e.g., by interrogating a database regarding their distribution). If this has occurred, it is very likely the that the server computers will perform the updates in the near future. Confirming the updated address lists may also be accomplished by receiving a confirmation from each server computer that the updates have been performed. If the updates are not confirmed, process 600 calls for continuing to confirm the updates.

In an embodiment, the network manager can include an interface, such as a web service API, that can receive a confirmation message sent by the host manager, indicating that it has successfully received the address lists sent from the network manager. The message can be parsed, and a worker process in the network manager can then generate a message for the address auditor. The address auditor can also include an interface such as a web service API, and the message from the network manager can be parsed by a worker process to determine that the address lists for security tables for the virtual machines that are allowed to access the web service have been updated.

Once it has been confirmed the IP address lists have been confirmed at the appropriate server computers, process 600 calls for notifying the service that it is safe to begin using the new IP addresses (operation 632). For example, a worker process in the address auditor can examine a data store indicating that the addresses have been confirmed, generate a message indicating that it is safe to remove the IP addresses from service, and send this message to the web service (e.g., over the Internet). The service may, for example, then place the IP addresses into a DNS, from which machines may discover the IP addresses.

Process 600 provides an interlock between a web service and a service provider network hosting a number of virtual machines that may use the service. By using process 600, the web service will not bring one or more IP addresses into service without the communication functions for the virtual machines being updated first. Thus, the server computers may continue to reach the service using the service's IP addresses while maintaining tight control on their connections.

Figure 7:
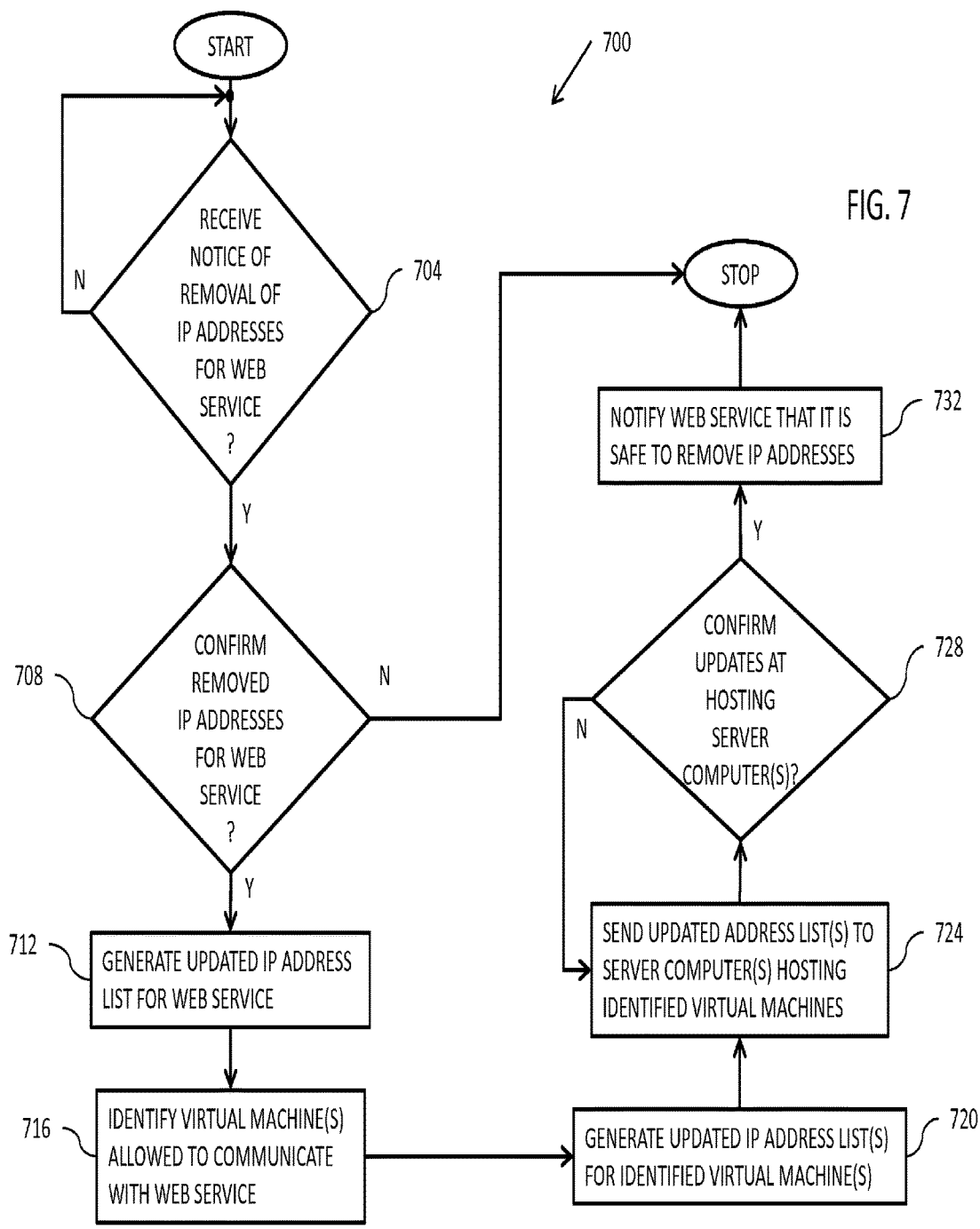
FIG. 7 is a flow diagram illustrating another example process for managing dynamic IP address assignments.

FIG. 7 illustrates another example process for managing dynamic IP address assignments. Process 700 may, for example, be implemented by a service provider network similar to service provider network 130. Process 700 may be used with process 400.

Process 700 calls for determining whether notice has been received that one or more IP addresses for a web service is being removed (operation 704). A service may provide notice of removal of IP addresses before removing them from service so that machines using the service may have their communication functions (e.g., route tables and security tables) updated before the IP addresses are removed. As part of this process, a web service may remove the IP addresses from its associated DNS so that traffic to the service using the IP addresses being removed begins to drain off. If notice of removal of one of more IP addresses for a service has not been received, process 700 calls for continuing to wait to receive notice of removal of one or more IP addresses for a service.

For example, an address auditor can include an interface, such as a web service API. In an embodiment, the messages from the web service can include an identifier for the service (e.g., a name and location where the service operates) and the IP address range that is being removed. The message can be parsed and the contents (e.g., the identifier and the IP addresses) can be stored in a data store.

Once notice of removal of one or more IP addresses for a service has been received, process 700 calls for confirming the removed IP addresses for the service (operation 708). Confirming the removed IP addresses for a service may, for example, be accomplished by interrogating a DNS associated with the service regarding the removed IP addresses. For example, and address auditor can include a worker process that checks the data store for new messages and then processes them by interrogating a DNS with the IP addresses being removed. Once the IP addresses are confirmed, the address auditor can update the data store indicating the same. If a DNS inquiry regarding an IP address does not produce a positive response (e.g., by returning a uniform resource locator (URL)), it may be inferred that the IP address is not being used by the service. As another example, for services that are affiliated with a service provider network (e.g., such as web service 150 in system 100), the removal of the IP addresses could be confirmed by analyzing logs for the IP addresses to detect the removal.

For example, an address auditor can include an interface, such as a web service API. In an embodiment, the messages from the network manager can include an identifier for the service (e.g., a name and location where the service operates) and the IP address range that has been removed. The message can be parsed and the contents (e.g., the identifier (s), and IP addresses) can be stored in a data store. The address auditor can include a worker process that checks the data store for new messages and then processes them by interrogating a DNS with the IP addresses being removed.

Once the IP addresses are removed, the address auditor can update the data store indicating the same.

If removal of the IP addresses cannot be confirmed for the service, process 700 is at an end. If, however, the IP addresses being removed for the service are confirmed, process 700 calls for generating an updated IP address list for the service (operation 712). This may, for example, be accomplished by removing the IP addresses from a previous IP address list for the service.

In an embodiment, an address auditor can include a worker process that checks a data store for a set of validated IP addresses that are being removed, then extracts (e.g., deletes) the IP addresses from a previous IP address list for the web service.

Process 700 also calls for identifying the virtual machines that are allowed to communicate with the service (operation 716). This may, for example, be accomplished by examining security groups to identify which ones are associated with the service and determining which virtual machines the identified security groups are associated with. Additionally, multiple instance of a virtual machine may exist.

In an embodiment, a network manager for the service provider network can include a worker process that checks (e.g., queries) a data store containing the security groups for an identifier (e.g., name) of the web service having its IP addresses adjusted.

Process 700 also calls for generating updated IP address lists for the identified virtual machine(s) (operation 720). This may, for example, be accomplished by merging the addresses for the service with other IP addresses associated with the virtual machines. The other IP addresses may, for example, be specified in security groups associated with the virtual machines. Thus, different address lists could be generated for each type of virtual machine.

In an embodiment, the address merger can include a worker process that retrieves (e.g., queries) a data store containing the security groups for a virtual machine type and combines (e.g., merges) the addresses contained therein together. Merging the addresses may include appending different address lists together and removing redundancies.

Process 700 also calls for sending the updated address lists(s) to the server computer(s) hosting the identified virtual machines (operation 724). The updated address list(s) may be delivered (e.g., pushed) to the server computer(s) through a service provider network infrastructure. At the server computer(s), a host manager may manage updating the security tables with the updated address lists. In an embodiment, a host manager may generate a new security table for a virtual machine using the associated address list. The new security table could then be swapped for the existing security table. A temporary hold may be placed on establishing new communication sessions while the security tables are switched.

Process 700 also calls for confirming the updated address lists at the hosting server computer(s) (operation 728). Confirming the updated address lists may, for example, be accomplished by confirming that the updated IP address lists have been distributed to the hosting server computers hosting the identified virtual machines (e.g., by interrogating a database regarding their distribution). Confirming the updated address lists may also be accomplished by receiving a confirmation from each server computer that the updates have been performed. If the updated are not confirmed, process 700 calls for continuing to confirm the updates.

For example, a network manager can include an interface, such as a web service API. In an embodiment, the host manager may send a confirmation message indicating that it has successfully received the address lists sent from the network manager. The message can be parsed, and a worker process in the network manager can then generate a message for the address auditor. The address auditor can also include an interface such as a web service API, and the message from the network manager can be parsed by a worker process to determine that the address lists for security tables for the virtual machines that are allowed to access the web service have been updated.

Once the IP address lists have been confirmed at the hosting server computer(s), process 700 calls for notifying the web service that it is safe to remove the IP addresses from use (operation 732). The service may, for example, then remove the IP addresses from an associated load balancer so that machines may no longer communicate with the service using the IP addresses being removed. For example, the work process may generate a message indicating that it is safe to remove the IP addresses from the web service and send the message to the service (e.g., over the Internet).

Process 700 provides an interlock between a web service and a service provider network hosting a number of virtual machines that may use the service. By using process 700, the web service will not remove one or more addresses from service without the communication functions for the virtual machines being updated first. Thus, the virtual machines may maintaining tight control on their security while still being ensured access to the web service.

Figure 8:
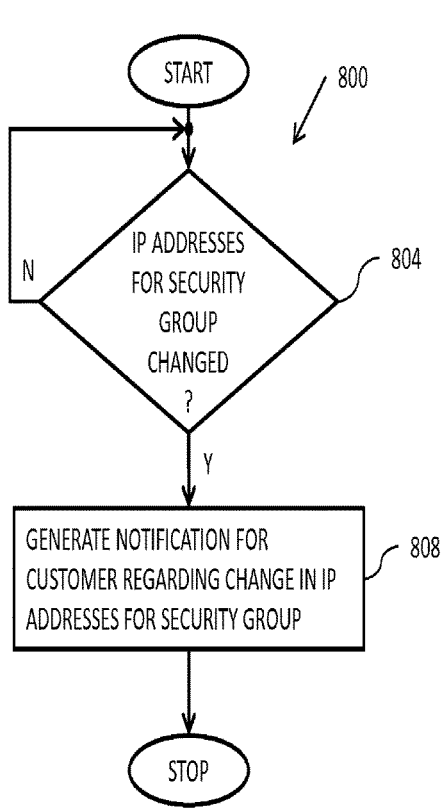
FIG. 8 is a flow diagram illustrating an example process for managing dynamic IP address assignments.

FIG. 8 illustrates an example process 800 for managing dynamic IP address assignments. Process 800 may, for example, be implemented by a network manager 134 of system 100 and used in conjunction with process 500.

Process 800 calls for determining whether IP addresses for a security group have changed (operation 804). Determining whether IP addresses for a security group have changed may, for example, be accomplished by determining that the IP addresses for a web service have changed and determining the security groups associated with the web service.

Determining that the IP addresses for a web service have changed may be accomplished by any of the techniques discussed previously. Determining the security groups associated with the web service may, for example, be accomplished by a worker process in a network manager checking (e.g., querying) a data store containing the security groups for an identifier (e.g., name) of the web service having its IP addresses changed.

Process 800 also calls for generating a notification for a customer regarding the change in IP addresses for the security group (operation 808). Notifying the customer may, for example, include generating a message (e.g., a text message, an electronic-mail message, etc.) indicating that IP addresses for the security group have changed. In particular implementations, the message may also indicate which IP addresses were changed (e.g., added and deleted). The changed IP addresses may, for instance, be available from an address auditor. In other implementations, the changed IP addresses may be stored in a log. The customer may be able to access the log at their convenience to review the changes of the IP addresses for the security group.

In certain embodiments, a worker process in an address auditor that adds new IP addresses for a web service to a data store (e.g., through a database insert operation) and removes unused IP addresses for the web service to the data store (e.g., through a database delete operation) may log the changes to the data store. These changes may be made available to the network manager. For example, an address auditor can include an interface such as a web service API, and a message from the network manager can be parsed by a worker process to determine that the changes to the IP address lists for a web service are desired. The changes may be retrieved from a data store (e.g., database or log) and sent to the network manager. The network manager can place these addresses changes in a message or store them in a log associated with the security group(s).

Figure 9:
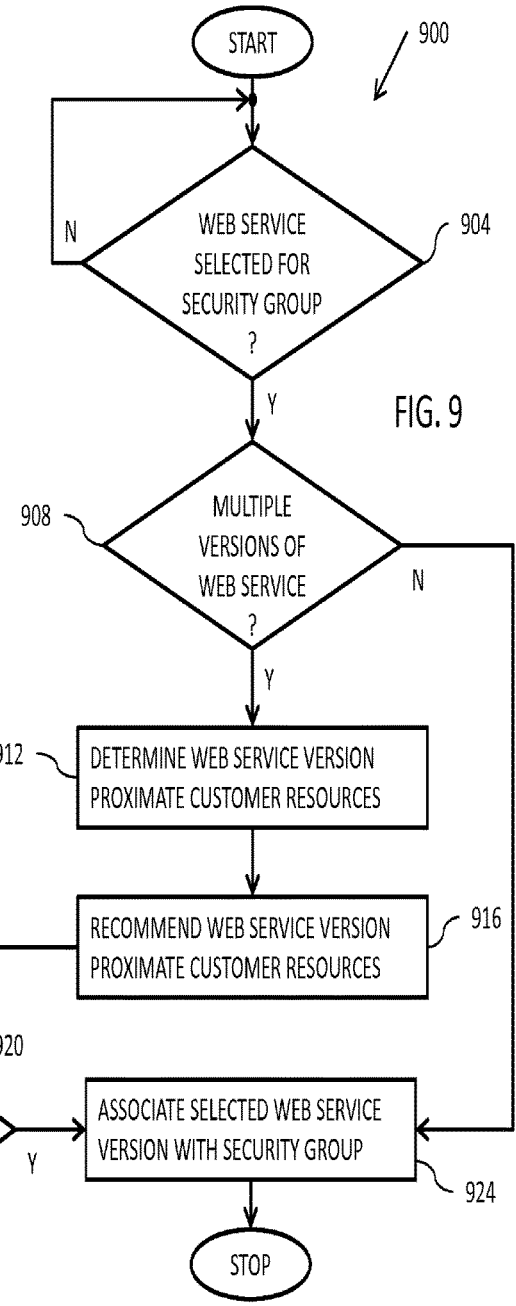
FIG. 9 is a flow diagram illustrating an example process for managing assignment of web services for security groups.

FIG. 9 illustrates an example process 900 for managing assignment of web services for security groups. Process 900 may, for example, be implemented by a network manager like network manager 134 in system 100 and used in conjunction with process 400.

Process 900 calls for determining whether a web service has been selected for a security group (operation 904). A web service may, for example, be selected for a security group by a customer making a selection in a graphical user interface (e.g., from a menu or a drop-down list). A network manager may generate the user interface for the customer based on an API call for creating and/or modifying a security group.

Process 900 also calls for determining whether multiple versions of the web service exist (operation 908). Determining whether multiple versions of a web service exist may, for example, be accomplished querying a data store containing metadata regarding web services. Multiple versions of a web service may, for example, exist if the web service is provided by an extended service provided network.

If multiple versions of the web service exist, process 900 calls for determining a web service version proximate the customer's resources (operation 912). Customer resources may, for example, include virtual machines and data stores. In certain implementations, the location at which the security group is being modified may designate location of the customer resources.

Customer resources are often implemented in a data center, which may be facilities that house and operate computer systems and associated components and may include redundant and backup power, communications, cooling and security systems. Datacenters may be located in a same geographical area, such as in a same facility and may be interconnected using private networks, such as high-speed fiber optic networks, controlled and managed by a service provider. Datacenters may also be distributed across geographically disparate locations and may be interconnected in part using public networks such as the Internet.

The resources (e.g., virtual machines, web services, etc.) running in a data center may be specified in a metadata data store regarding the data center. Thus, determining a version of the web service proximate the customer resources may be accomplished by determining whether the customer resources and a version of the web service are located in the same data center. Additionally, geographic locations of data centers (e.g., Eastern US) may be specified in metadata regarding the data center. Thus, determining a version of the web service proximate the customer resources may be accomplished by determining if a version of the web service is being implemented in the same geographic region as the customer resources.

In particular implementations, the actual geographic locations of a data center implementing the customer resources and the data centers hosting the versions of the web service may be analyzed. Thus, a data center hosting a web service version that is closest to the data center hosting the customer resources may be determined.

Process 900 also includes recommending the web service version proximate the customer's resources (operation 916).

This recommendation may, for example, be communicated to a customer in a graphical user interface by a network manager.

Process 900 further calls for determining whether a version of the web service has been selected (operation 920). The customer may select the recommended version of the web service or another version based on their preference.

Once a version of the web service has been selected, process 900 calls for associating the selected web service version with the selected security group (operation 924). Associating the selected web service version with the selected security group may, for example, include inserting an identifier (e.g., name) for the security group along with a version identifier in a data store for the security group. Process 900 is then at an end.

If there are not multiple versions of a web service available (operation 908), process 900 calls for associating the selected web service version (in this case the only one) with the selected security group (operation 924). Process 900 is then at an end.

Figure 10:
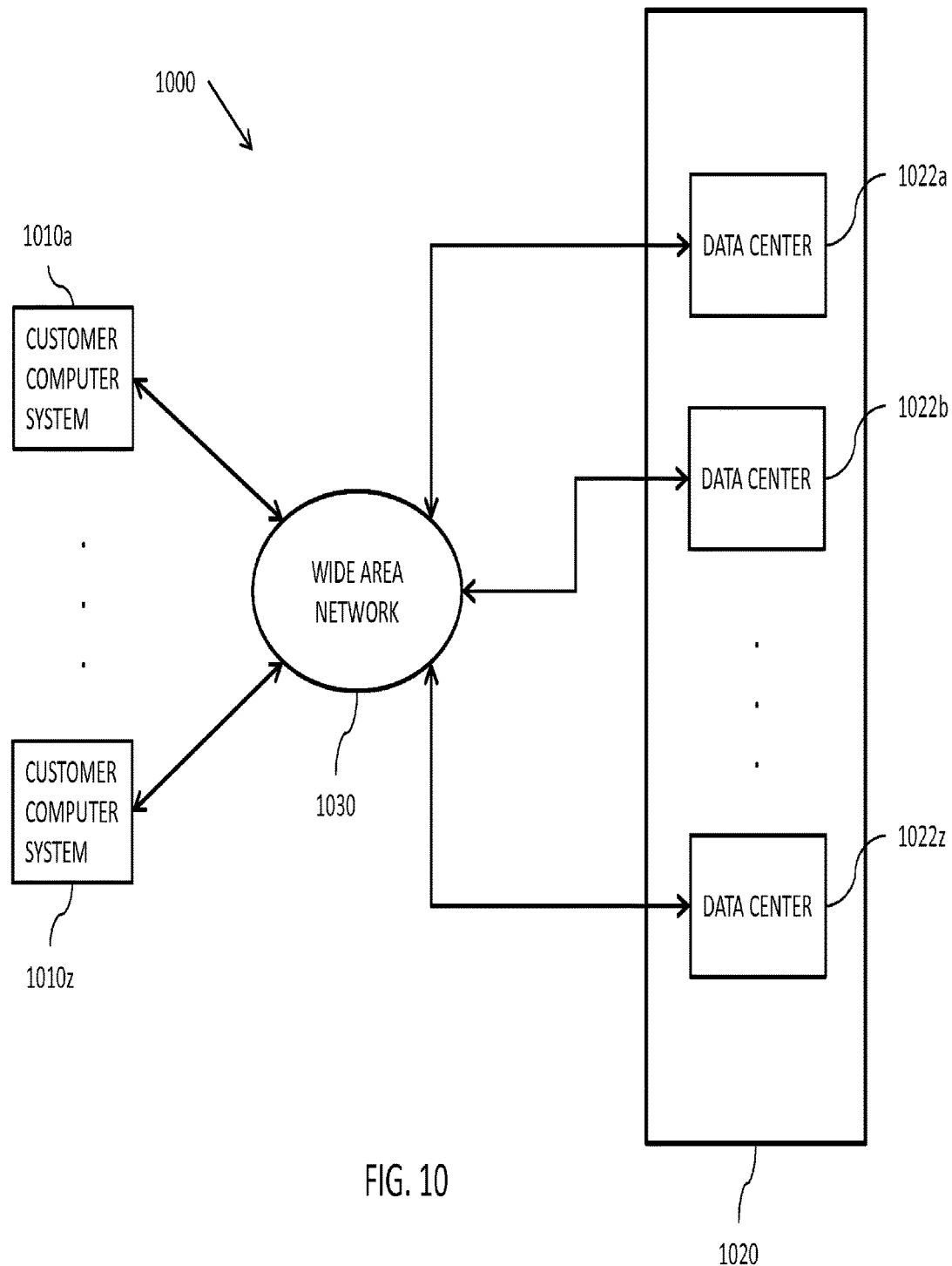
FIG. 10 is a block diagram illustrating selected components of an example system for managing dynamic IP address assignments.
Figure 11:
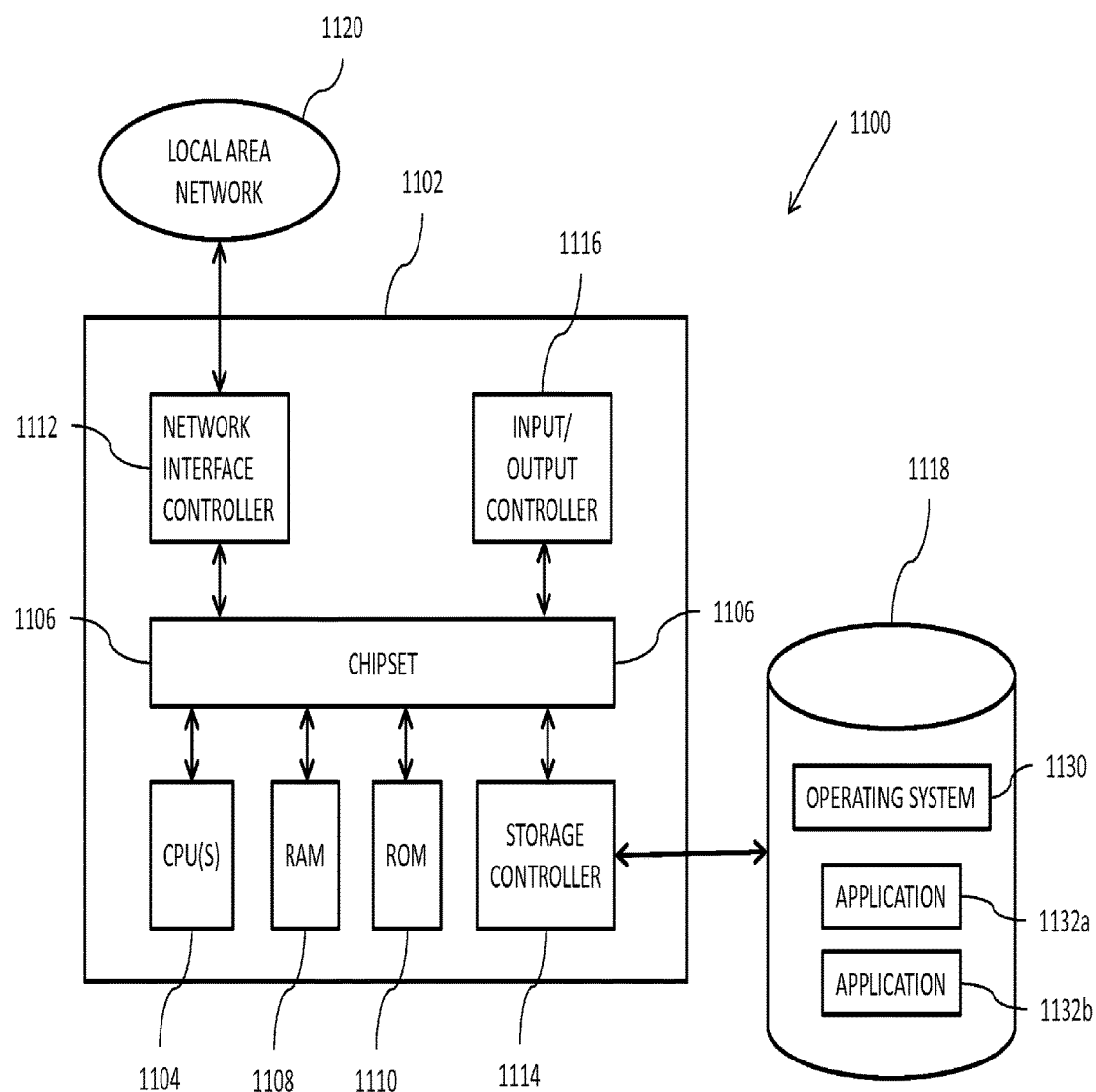
FIG. 11 is a block diagram illustrating selected components of an example computer system for managing dynamic IP address assignments.

FIGS. 10-11 are similar to FIG. 1 in that they depict example operating environments in which embodiments disclosed herein may be implemented, and these figures depict these operating environments at varying levels of granularity. FIG. 10 generally depicts a web services platform 1020 that includes a plurality of datacenters 1022. FIG. 11 generally depicts a computer system 1100 that may be part of a larger system (e.g., a data center).

It may be appreciated that these operating environments of FIGS. 10-11 may be used to implement aspects of the operating environment of FIG. 1. For example, interface 132, network manager 134, address auditor 136, address merger 138, or server computers 140 may be implemented in a datacenter 1022 or across multiple datacenters 1022 of FIG. 10. Likewise, communication network 120 of FIG. 1 may be wide area network 1030 of FIG. 10, and customer computer systems 110 of FIG. 1 may be customer computer systems 1010 of FIG. 10.

FIG. 10 depicts an example system 1000 for managing dynamically assigned IP addresses. A cloud service provider (such as web services platform 1020) may configure the illustrated computing environment to host virtual clouds of entities and to enable communication paths between these virtual clouds that may otherwise be isolated. In particular, FIG. 10 is a system and network diagram that shows an illustrative operating system 1000 that includes a web services platform 1020, for implementing virtual clouds and for providing on-demand access to compute resources such as virtual machine instances. Web services platform 1020 can provide compute resources for executing applications on a permanent or an as-needed basis and may be configured as a private network. These compute resources may include various types of resources such as data processing resources, data storage resources, data communication resources and the like. Each type of compute resource may be general-purpose or may be available in a number of specific configurations. For example, data processing resources may be available as virtual machine instances. The instances may be configured to execute applications, including Web servers, application servers, media servers, database servers and the like. Data storage resources may include file storage devices, block storage devices and the like.

Each type or configuration of compute resource may be available in different sizes, such as large resources consisting of many processors, large amounts of memory and/or large storage capacity and small resources consisting of fewer processors, smaller amounts of memory and/or smaller storage capacity. Entities may choose to allocate a number of small processing resources as Web servers and/or one large processing resource as a database server, for example.

The compute resources provided by web services platform 1020 may be enabled by one or more datacenters 1022, which may be referred herein singularly as "datacenter 1022" or in the plural as "datacenters 1022." Datacenters 1022 may be facilities that house and operate computer systems and associated components and may include redundant and backup power, communications, cooling and security systems. Datacenters 1022 may be located in a same geographical area, such as in a same facility and may be interconnected using private networks, such as high-speed fiber optic networks, controlled and managed by a service provider of web services platform 1020. Datacenters 1022 may also be distributed across geographically disparate locations and may be interconnected in part using public networks such as the Internet.

Entities of web services platform 1020 may access the compute resources provided by datacenters 1022 over a wide-area network ("WAN") 1030. Although a WAN is illustrated in FIG. 10, it should be appreciated that a local-area network ("LAN"), the Internet or any other networking topology known in the art that connects datacenters 1022 to remote entities and other users may be utilized. It should also be appreciated that combinations of such networks may also be utilized.

An entity or other entities that are customers of web services platform 1020 may utilize a computer system 810 to access the compute resources provided by datacenters 1022. Customer computer system 810 comprises a computer capable of accessing web services platform 1020, such as a server computer, a desktop or laptop personal computer, a tablet computer, a wireless telephone, a PDA, an e-reader, a game console, a set-top box or any other computing node.

As is described in greater detail above, customer computer systems 1010 may be utilized to configure aspects of the compute resources provided by web services platform 1020. In this regard, web services platform 1020 may provide a Web interface through which aspects of its operation may be configured through the use of a Web browser application program executing on customer computing system 810. Alternatively, a stand-alone application program executing on customer computing system 810 may access an application programming interface ("API") exposed by web services platform 1020 for performing the configuration operations. Other mechanisms for configuring the operation of web services platform 1020, including launching new virtual machine instances on web services platform 1020, may also be utilized.

According to embodiments disclosed herein, capacities of purchased compute resources provided by web services platform 1020 can be scaled in response to demand. In this regard, scaling refers to the process of instantiating, which may also be referred to herein as "launching" or "creating," or terminating, which may also be referred to herein as "de-scaling," instances of compute resources in response to demand.

Auto scaling may be one mechanism for scaling compute resources in response to increases or lulls in demand for the resources. Auto scaling may allow entities of web services platform 1020 to scale their purchased compute resources according to conditions defined by the entity. For instance, rules may be defined for scaling up capacity in a particular manner in response to the occurrence of specified conditions, such as a spike in demand. Similarly, rules may also be defined to scale down capacity in a particular manner in response to the occurrence of other conditions, such as a lull in demand. The mechanisms disclosed herein for launching virtual machine instances may be utilized when instances are manually launched by an entity or when instances are launched by an auto scaling component in web services platform 1020.

Web services platform 1020 may also be configured with a deployment component to assist entities in the deployment of new instances of compute resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared and other types of information. The deployment component utilizes the entity-provided configuration and cache warming logic to launch, configure and prime new instances of compute resources.

FIG. 11 depicts an example computer system 1100 capable of executing the above-described software components. With regard to the example system described with respect to FIG. 1, interface 132, network manager 134, address auditor 134, address merger 138, and customer computer system 110 may each be implemented in computer system 1100.

The computer architecture shown in FIG. 11 illustrates a conventional server computer, workstation, desktop computer, laptop, tablet, network appliance, PDA, e-reader, digital cellular phone or other computing node, and may be utilized to execute any aspects of the software components presented herein described as executing within datacenters 1022, on server computers 140, on the customer computer systems 110 or on any other computing system mentioned herein.

Computer system 1100 may include a baseboard, or "motherboard," which is a printed circuit board to which a multitude of components or devices may be connected by way of a system bus or other electrical communication paths. One or more central processing units ("CPUs") 1104 may operate in conjunction with a chipset 1106. CPUs 1104 may be standard programmable processors that perform arithmetic and logical operations necessary for the operation of computer system 1100.

CPUs 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

Chipset 1106 may provide an interface between CPUs 1104 and the remainder of the components and devices on the baseboard. Chipset 1106 may provide an interface to a random access memory ("RAM") 1108 used as the main memory in computer system 1100. Chipset 1106 may further provide an interface to a computer-readable storage medium such as a read-only memory ("ROM") 1110 or non-volatile RAM ("NVRAM") for storing basic routines that may help to start up computer system 1100 and to transfer information between the various components and devices. ROM 1110 or NVRAM may also store other software components necessary for the operation of computer system 1100 in accordance with the embodiments described herein.

Computer system 1100 may operate in a networked environment using logical connections to remote computing nodes and computer systems through network 1120. Chipset 1106 may include functionality for providing network connectivity through a network interface controller ("NIC") 1112, such as a gigabit Ethernet adapter. NIC 1112 may be capable of connecting the computer system 1100 to other computing nodes over network 1120. It should be appreciated that multiple NICs 1112 may be present in computer system 1100, connecting the computer to other types of networks and remote computer systems.

Computer system 1100 may be connected to a mass storage device 1118 that provides non-volatile storage for the computer. Mass storage device 1118 may store system programs, application programs, other program modules and data which have been described in greater detail herein. Mass storage device 1118 may be connected to computer system 1100 through a storage controller 1124 connected to chipset 1106. Mass storage device 1118 may consist of one or more physical storage units. Storage controller 1124 may interface with the physical storage units through a serial attached SCSI ("SAS") interface, a serial advanced technology attachment ("SATA") interface, a fiber channel ("FC") interface or other type of interface for physically connecting and transferring data between computers and physical storage units.

Computer system 1100 may store data on mass storage device 1118 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 1118 is characterized as primary or secondary storage and the like.

For example, computer system 1100 may store information to mass storage device 1118 by issuing instructions through storage controller 1114 to alter the magnetic characteristics of a particular location within a magnetic disk drive unit, the reflective or refractive characteristics of a particular location in an optical storage unit or the electrical characteristics of a particular capacitor, transistor or other discrete component in a solid-state storage unit. Other transformations of physical media are possible without departing from the scope and spirit of the present description, with the foregoing examples provided only to facilitate this description. Computer system 1100 may further read information from mass storage device 1118 by detecting the physical states or characteristics of one or more particular locations within the physical storage units.

In addition to mass storage device 1118 described above, computer system 1100 may have access to other computer-readable storage media to store and retrieve information, such as program modules, data structures or other data. It should be appreciated by those skilled in the art that computer-readable storage media can be any available media that provides for the storage of non-transitory data and that may be accessed by computer system 1100.

By way of example and not limitation, computer-readable storage media may include volatile and non-volatile, transitory and non-transitory, removable and non-removable media implemented in any method or technology. Computer-readable storage media includes but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage, other magnetic storage devices or any other medium that can be used to store the desired information in a non-transitory fashion.

Mass storage device 1118 may store an operating system utilized to control the operation of the computer system 1100. According to one embodiment, the operating system comprises a version of the LINUX operating system. According to another embodiment, the operating system comprises a version of the WINDOWS® SERVER operating system from the MICROSOFT Corporation. According to further embodiments, the operating system may comprise a version of the UNIX operating system. It should be appreciated that other operating systems may also be utilized. Mass storage device 1118 may store other system or application programs and data utilized by computer system 1100, such as network manager 134, address auditor 136, or address merger 138, and/or the other software components described above.

Mass storage device 1118 or other computer-readable storage media may also be encoded with computer-executable instructions, which, when loaded into computer system 1100, transforms the computer from a general-purpose computing system into a special-purpose computer capable of implementing the embodiments described herein. These computer-executable instructions transform computer system 1100 by specifying how CPUs 1104 transition between states, as described above. Computer system 1100 may have access to computer-readable storage media storing computer-executable instructions, which, when executed by computer system 1100, may perform operating procedures depicted in FIGS. 2-7.

Computer system 1100 may also include an input/output controller 1116 for receiving and processing input from a number of input devices, such as a keyboard, a mouse, a touchpad, a touch screen, an electronic stylus or other type of input device. Similarly, input/output controller 1116 may provide output to a display, such as a computer monitor, a flat-panel display, a digital projector, a printer, a plotter or other type of output device. It will be appreciated that computer system 1100 may not include all of the components shown in FIG. 11, may include other components that are not explicitly shown in FIG. 11 or may utilize an architecture completely different than that shown in FIG. 11.

As described herein, a computing node may be a physical computing node, such as computer system 1100 of FIG. 11. A computing node may also be a virtual computing node, such as a virtual machine instance, or a session hosted by a physical computing node, where the computing node is configured to host one or more sessions concurrently.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware or a combination of software and hardware. Other implementations should be apparent to those skilled in the art. It should also be appreciated that a server, gateway or other computing node may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A non-transitory computer-readable storage medium having computer-executable instructions stored thereupon that, as a result of being executed by a computer system, cause the computer system to:
    receive a selection of an identifier for a web service by a customer of a service provider network, the service provider network having a server computer hosting one or more virtual machines for the web service;
    determine one or more public IP addresses for the web service based at least in part on the identifier;
    identify a virtual machine of the customer in the service provider network that is allowed to communicate with the web service;
    generate an IP address list for the identified virtual machine, the IP address list including the one or more public IP addresses, determined by an address auditor that audits information associated with how IP addresses are being used by web services, for the web service;
    update the IP address list to reflect detected changes to the one or more public IP addresses for the web service; and
    provide a security table for the identified virtual machine with the updated IP address list so as to enable the identified virtual machine associated with the customer to communicate with the web service using addresses from the updated IP address list specific to the identified virtual machine.

2. The non-transitory computer readable storage medium of claim 1, having further computer-executable instructions stored thereupon which, as a result of being executed by a computer system, cause the computer system to:
    determine, using the address auditor, whether a computer network address for the web service has changed;
    confirm the computer network address for the web service;
    generate one or more updated computer network address lists for the identified virtual machine, the one or more updated computer network address lists including the computer network address for the web service that has changed; and
    update the security table for the identified virtual machine with the one or more updated computer network address lists.

3. The non-transitory computer readable storage medium of claim 2, wherein determining whether the computer network address for the web service has changed comprises receiving notice of a new computer network address for the web service.

4. The non-transitory computer readable storage medium of claim 3, having further computer-executable instructions stored thereupon which, as a result of being executed by a computer system, cause the computer system to:
    determine that the one or more updated computer network address lists have been distributed to the server computer hosting the identified virtual machine; and
    generate a notification for the web service enabling the use of the new computer network address.

5. A method, comprising:
    receiving, from a user, a specification of an identifier for a web service and an indication of one or more virtual machines of the user, the identifier associated with at least one network address for the web service;
    generating one or more network address lists for the one or more virtual machines based at least in part on the specification of the identifier, the one or more network address lists including the at least one network address, determined by an address auditor performing an audit on IP address associated with the web service, for the web service capable of communicating with the one or more virtual machines; and
    updating at least one security table for the one or more virtual machines with the one or more network address lists at a server computer hosting the one or more virtual machines based at least on part on one or more detected changes to the at least one network address for the web service, the at least one security table used by the server computer to at least determine whether to allow communication addressed to or from the at least one network address for the web service.

6. The method of claim 5, further comprising:
determining, using the address auditor to audit IP addresses associated with the web service, whether one or more IP addresses for the web service have changed;
confirming the one or more IP addresses for the web service;
generating one or more updated IP address lists for the one or more virtual machines in a service provider network, the one or more updated IP address lists including the one or more IP addresses for the web service;
and updating the at least one security table for the one or more virtual machines with the one or more updated IP address lists at the server computer hosting the one or more virtual machines.

7. The method of claim 5, wherein the address auditor determines whether one or more new IP addresses exist for the web service.

8. The method of claim 7, further comprising:
determining that the one or more updated IP address lists have been distributed to the server computer hosting the one or more virtual machines; and
generating a notification for the web service enabling the use of the one or more new IP addresses.

9. The method of claim 5, wherein the address auditor determines whether one or more IP addresses for the web service are to be deleted.

10. The method of claim 6, further comprising:
determining that the one or more updated IP address lists have been distributed to the server computer hosting the one or more virtual machines; and
generating a notification for the web service that it is safe to use the one or more updated address lists.

11. The method of claim 5, wherein generating one or more network address lists for the one or more virtual machines based at least in part on the specification of the identifier comprises merging the at least one network address for the web service with one or more network addresses specified for the virtual machines.

12. The method of claim 5, wherein generating one or more network address lists for the one or more virtual machines based at least in part on the specification of the identifier comprises expanding a network address prefix into a plurality of network addresses.

13. The method of claim 5, further comprising generating a notification regarding a change in IP address for a security group associated with the web service.

14. The method of claim 5, further comprising:
receiving a customer selection of a web service for a security group;
determining whether a web service version is proximate to a customer resource;
recommending use of the web service version proximate to the customer resource;
receiving a customer selection of a web service version; and
associating the selected web service version with the security group.

15. A system, comprising:
one or more computing devices comprising processing units and memory;
the one or more computing devices configured to:
receive, from a user, a specification of an identifier for a web service and an indication of one or more virtual machines of the user, the identifier associated with at least one network address for the web service;
generate one or more network address lists for the one or more virtual machines based at least in part on the specification of the identifier, the one or more network address lists including the at least one network address, determined by using an address auditor that interrogates IP addresses associated with the web service, for the web service; and
update at least one security table for the one or more virtual machines with the one or more network address lists at one or more server computers hosting the one or more virtual machines based at least in part on one or more detected changes to the at least one network address for the web service, the at least one security table used by the one or more server computers to at least determine whether to allow communication addressed to or from the at least one network address for the web service.

16. The system of claim 15, wherein the computing devices are further configured to:
determine, using the address auditor, whether one or more IP addresses for the web service have changed;
confirm the one or more IP addresses for the web service;
generate one or more updated IP address lists for one or more virtual machines in a service provider network, the one or more updated IP address lists including the one or more IP addresses for the web service; and
update the at least one security table for the one or more virtual machines with the one or more updated IP address lists at the one or more server computers hosting the one or more virtual machines.

17. The system of claim 15, wherein the address auditor determines whether one or more new IP addresses exist for the web service.

18. The system of claim 17, wherein the computing devices are further configured to:
determine that the one or more updated IP address lists have been distributed to the one or more server computers hosting the one or more virtual machines; and
generate a notification for the web service enabling the use of the one or more new IP addresses.

19. The system of claim 15, wherein the address auditor determines whether one or more IP addresses for the web service have been deleted.

20. The system of claim 19, wherein the computing devices are further configured to:
determine that the one or more updated IP address lists have been distributed to the one or more server computers hosting the one or more virtual machines; and
generate a notification for the web service that it is safe to use the one or more updated IP address lists.

21. The system of claim 15, wherein generating one or more network address lists for the one or more virtual machines based at least in part on the specification of the identifier comprises merging the at least one network address for the web service with one or more network addresses specified for the virtual machines.

22. The system of claim 15, wherein generating one or more network address lists for the one or more virtual machines based at least in part on the specification of the identifier comprises expanding a network address prefix into a plurality of network addresses.

23. The system of claim 15, wherein the one or more computing devices are further configured to generate a notification regarding a change in IP address for one or more security groups associated with the web service.

24. The system of claim 15, wherein the one or more computing devices are further configured to:

receive a customer selection of a web service for a security group;
determine whether a web service version is proximate to one or more customer resources;
recommend use of the web service version proximate to the one or more customer resources;
receive a customer selection of a web service version; and
associate the selected web service version with the security group.

* * * * *